United States Patent
Steiner et al.

(10) Patent No.: US 9,664,181 B2
(45) Date of Patent: May 30, 2017

(54) THERMOACOUSTIC TRANSDUCER APPARATUS INCLUDING A TRANSMISSION DUCT

(71) Applicant: ETALIM INC., Vancouver (CA)

(72) Inventors: Thomas Walter Steiner, Burnaby (CA); Briac Medard De Chardon, Vancouver (CA); Kristjan Tod Gottfried, Vancouver (CA); Ronald Gregory Klopfer, North Vancouver (CA)

(73) Assignee: Etalim Inc., Vancouver, BC (CA)

( * ) Notice: Subject to any disclaimer, the term of this patent is extended or adjusted under 35 U.S.C. 154(b) by 253 days.

(21) Appl. No.: 14/429,553

(22) PCT Filed: Sep. 17, 2013

(86) PCT No.: PCT/CA2013/000794
§ 371 (c)(1),
(2) Date: Mar. 19, 2015

(87) PCT Pub. No.: WO2014/043790
PCT Pub. Date: Mar. 27, 2014

(65) Prior Publication Data
US 2015/0247491 A1 Sep. 3, 2015

Related U.S. Application Data

(60) Provisional application No. 61/702,918, filed on Sep. 19, 2012.

(51) Int. Cl.
*F03G 7/00* (2006.01)
*F02G 1/043* (2006.01)
*F25B 9/14* (2006.01)

(52) U.S. Cl.
CPC ............. *F03G 7/002* (2013.01); *F02G 1/043* (2013.01); *F25B 9/14* (2013.01); *F02G 2243/00* (2013.01); *F25B 2309/1403* (2013.01)

(58) Field of Classification Search
CPC ...... F03G 7/002; F02G 1/043; F02G 2243/00; F25B 9/14; F25B 2309/1403
(Continued)

(56) References Cited

U.S. PATENT DOCUMENTS 4,114,380 A 9/1978 Ceperley
4,148,195 A 4/1979 Gerstmann et al.
(Continued)

FOREIGN PATENT DOCUMENTS

CN 1766314 A 5/2006
CN 1779386 A 5/2006
(Continued)

OTHER PUBLICATIONS

Extended European Search Report; EP 13839065; Jun. 6, 2016.
(Continued)

*Primary Examiner* — Hoang Nguyen
(74) *Attorney, Agent, or Firm* — Smart & Biggar

(57) ABSTRACT

A thermoacoustic transducer includes a mechanical converter providing power conversion between acoustic and mechanical power and includes a diaphragm defining a compression and an expansion chamber. A thermal converter including a flow passage having a regenerator portion is thermally coupled for conversion between acoustic and thermal power. The mechanical converter is in fluid communication with the flow passage through transmission ducts completing an acoustic power loop having a volume containing a working gas. A transmission duct cross-sectional area is less than a regenerator flow area, which is less than a diaphragm surface area. The diaphragm undergoes (Continued)

resilient displacement causing pressure oscillations within the volume. The power loop is configured to cause one location along the loop to have anti-phase pressure oscillations to pressure oscillations in the mechanical converter.

34 Claims, 9 Drawing Sheets

(58) Field of Classification Search
USPC .......................... 60/517, 520, 522, 526; 62/6
See application file for complete search history.

(56) References Cited

U.S. PATENT DOCUMENTS

| | | | |
|---|---|---|---|
| 4,355,517 A | 10/1982 | Ceperley | |
| 4,398,398 A | 8/1983 | Wheatley et al. | |
| 4,489,553 A | 12/1984 | Wheatley et al. | |
| 5,435,136 A | 7/1995 | Ishizaki et al. | |
| 5,647,216 A | 7/1997 | Garrett | |
| 5,901,556 A | 5/1999 | Hofler | |
| 5,953,920 A | 9/1999 | Swift et al. | |
| 6,032,464 A | 3/2000 | Swift et al. | |
| 6,307,287 B1 | 10/2001 | Garrett et al. | |
| 6,314,740 B1 | 11/2001 | De Blok et al. | |
| 6,560,970 B1 | 5/2003 | Swift | |
| 6,578,364 B2 | 6/2003 | Corey | |
| 6,725,670 B2 | 4/2004 | Smith et al. | |
| 7,104,055 B2 | 9/2006 | Matsubara et al. | |
| 7,404,296 B2 | 7/2008 | Watanabe et al. | |
| 7,908,855 B2 | 3/2011 | Smith | |
| 7,908,856 B2 | 3/2011 | Backhaus et al. | |
| 8,004,156 B2 | 8/2011 | Symko et al. | |
| 8,143,767 B2 | 3/2012 | Symko et al. | |
| 8,181,460 B2 | 5/2012 | McQuary et al. | |
| 8,640,467 B2 * | 2/2014 | Bretagne ........................... | 62/6 |
| 2005/0274123 A1 | 12/2005 | Smith et al. | |
| 2007/0261839 A1 | 11/2007 | Watanabe et al. | |
| 2008/0072607 A1 * | 3/2008 | Haberbusch ............ | F25B 9/145 62/6 |
| 2008/0110180 A1 | 5/2008 | Watanabe et al. | |
| 2008/0229760 A1 * | 9/2008 | Gedeon ................... | F25B 9/145 62/6 |
| 2008/0276625 A1 | 11/2008 | Bretagne et al. | |
| 2009/0249797 A1 | 10/2009 | Backhaus et al. | |
| 2011/0025073 A1 | 2/2011 | Garner et al. | |
| 2011/0252811 A1 | 10/2011 | Aldraihem | |
| 2011/0259000 A1 | 10/2011 | Nakamura | |
| 2011/0259003 A1 | 10/2011 | Yamamoto | |
| 2011/0265493 A1 | 11/2011 | Schwartz | |
| 2012/0144821 A1 | 6/2012 | Wood | |
| 2012/0159943 A1 | 6/2012 | Steiner et al. | |

FOREIGN PATENT DOCUMENTS

| | | |
|---|---|---|
| CN | 101210749 A | 7/2008 |
| CN | 101236025 A | 8/2008 |
| CN | 101309040 A | 11/2008 |
| CN | 101706169 A | 5/2010 |
| CN | 102331109 A | 1/2012 |
| DE | 102008050653 A1 | 4/2010 |
| FR | 2956200 A1 | 8/2011 |
| JP | 2003324932 A | 11/2003 |
| JP | 2007237020 A | 9/2007 |
| JP | 2011099606 A | 5/2011 |
| JP | 2011122567 A | 6/2011 |
| JP | 2011122765 A | 6/2011 |
| JP | 2011127870 A | 6/2011 |
| KR | 20070023272 A | 9/2008 |
| WO | 90/11447 A1 | 10/1990 |
| WO | 2008/131687 A1 | 11/2008 |
| WO | 2010/037358 A1 | 4/2010 |
| WO | 2010/107308 A1 | 9/2010 |
| WO | 2011/003207 A1 | 1/2011 |
| WO | 2011003207 A1 | 1/2011 |
| WO | 2012065245 A1 | 4/2012 |
| WO | 2012/065245 A1 | 5/2012 |

OTHER PUBLICATIONS

Idelchek, "Handbook of Hydraulic Resistance 3rd Ed." Begell House (1994). pp. 2-35.
G.W. Swift, "Thermoacoustics" Acoustical Society of America (2002). pp. 193-198, 225-230.
Ward et al., Design Environment for Low-amplitude Thermoacoustic Energy Conversion DeltaEC Users Guide, www.lanl.gov/thermoacoustics (2012). pp. 61-130.
International Search Report and Written Opinion, Nov. 15, 2015, PCT/CA2013/000794.

* cited by examiner

THERMOACOUSTIC TRANSDUCER APPARATUS INCLUDING A TRANSMISSION DUCT

RELATED APPLICATIONS

This application is the U.S. National Stage of International Application No. PCT/CA2013/000794, filed Sep. 17, 2013, published in English, and claims the benefit of U.S. Provisional Application No. 61/702,918, filed on Sep. 19, 2012, the entire teachings of the above applications are incorporated herein by reference.

BACKGROUND OF THE INVENTION

1. Field of Invention

This invention relates generally to thermoacoustic transducers and more particularly to a thermoacoustic transducer for converting between thermal energy and mechanical energy.

2. Description of Related Art

Thermoacoustic transducers may be configured to operate as a heat engine where thermal energy is received and the transducer converts the thermal energy into mechanical energy, which may be used to drive an electrical generator, for example. Alternatively a thermoacoustic transducer may be configured to operate as a heat pump where mechanical energy is received and the transducer converts the mechanical energy into a thermal energy transfer from lower temperature to higher temperature.

Thermoacoustic transducers may implement the Stirling cycle using displaceable diaphragms to produce useful power density and operating efficiency. When configured as a heat engine, increases in efficiency may be achieved by increasing a temperature differential between a hot side and a cold side of the transducer. However such temperature increases may require implementation of a more complex structural architecture and/or the use of specialized high temperature materials.

SUMMARY OF THE INVENTION

In accordance with one aspect of the invention there is provided a thermoacoustic transducer apparatus. The apparatus includes a mechanical converter operable to provide power conversion between acoustic power and mechanical power. The mechanical converter includes at least one diaphragm defining a compression chamber and an expansion chamber within the mechanical converter, the at least one diaphragm having a diaphragm surface area. The apparatus also includes a thermal converter including a flow passage having a regenerator portion thermally coupled to provide power conversion between acoustic power and thermal power, the regenerator portion having a regenerator flow area. The mechanical converter is in fluid communication with the flow passage of the thermal converter through transmission ducts extending between the compression chamber and the flow passage and between the expansion chamber and the flow passage respectively. The transmission ducts complete an acoustic power loop through the flow passage between the compression chamber and the expansion chamber. The acoustic power loop has a working volume for containing a working gas and being operable to facilitate acoustic power flow between the compression chamber and the expansion chamber. A cross-sectional area of the transmission ducts is less than the regenerator flow area and the regenerator flow area is less than the diaphragm surface area. The at least one diaphragm is operable to undergo resilient displacement to cause pressure oscillations within the working volume and the acoustic power loop is configured to cause at least one location along the acoustic power loop to have pressure oscillations that have an anti-phase relation to pressure oscillations in the mechanical converter.

The flow passage of the thermal converter may include a plurality of the regenerator portions configured for parallel flow and the regenerator flow area may include an overall area associated with the plurality of the regenerator portions.

The mechanical converter may include a plurality of mechanical converters configured in parallel and the diaphragm surface area may include an overall diaphragm surface area associated with the plurality of mechanical converters.

The first cross-sectional area of the transmission ducts may be at least about 10 times less than the diaphragm surface area.

The transmission duct between the compression chamber and the flow passage may have a first cross-sectional area and the transmission duct between the expansion chamber and the flow passage may have a second cross-sectional area and the first cross-sectional area may be less than the second cross-sectional area.

The transmission ducts may have respective lengths that may be selected to cause a phase change of about 360 degrees between pressure oscillations in the compression chamber and pressure oscillations in the expansion chamber.

The transmission ducts may have respective lengths that are selected to cause an initial phase change about 360 degrees between pressure oscillations in the compression chamber and pressure oscillations in the expansion chamber, and at least one additional 360 degree phase change between pressure oscillations in the compression chamber and pressure oscillations in the expansion chamber such that an overall phase change through the acoustic power loop has the same effect as the initial phase change.

The apparatus may further include a mechanical spring coupled to the at least one diaphragm and the resilient displacement may occur at a resonant frequency that is in part dependent on an overall stiffness acting on the at least one diaphragm, the overall stiffness including at least a diaphragm stiffness, a gas stiffness due to working gas bearing on the at least one diaphragm, and the mechanical spring stiffness, and a contribution to the overall stiffness associated with the mechanical spring stiffness may include at least half of the overall stiffness.

A change in temperature in the transmission ducts may result in a change of speed of sound associated with acoustic power flow within the acoustic power loop and the respective lengths of the transmission ducts may be configured such that relative proportions of the gas stiffness and the mechanical spring stiffness in the overall stiffness cause the change in speed of sound to be at least partially offset by a corresponding change in the resonant frequency such that the phase change between the pressure oscillations in the compression chamber and the pressure oscillations in the expansion chamber due to the change in the speed of sound are at least partially compensated.

The mechanical converter may be housed within a pressure vessel and the at least one diaphragm may be coupled to an external energy system for transfer of mechanical power between the external energy system and the at least one diaphragm, the external energy system being disposed outside of the pressure vessel, and the resonant frequency may be further dependent on an overall mass including at least a diaphragm mass and an external mass associated with the coupling to the external energy system, the external mass being greater than the diaphragm mass.

The external energy system may include one of an electric generator, and a prime mover.

The mechanical spring may include a resilient wall portion coupled between the at least one diaphragm and a chamber wall of one of one of the compression chamber and the expansion chamber, the resilient wall portion being operable to provide a seal for containing working gas within the chamber while facilitating the resilient displacement of the at least one diaphragm.

The resilient wall portion may include a cylindrical tube extending between the at least one diaphragm and the chamber wall, the tube being configured to elastically deform in a direction generally aligned with a cylindrical axis of the tube.

The cylindrical tube may include a first cylindrical tube portion coupled to the at least one diaphragm and a second cylindrical tube portion coupled to the chamber wall, the first and second cylindrical tube portions being coaxially disposed and coupled together to form a folded cylindrical tube.

An extent of at least one of the compression chamber and the expansion chamber may be selected to provide a desired acoustic impedance for facilitating acoustic coupling between the chamber and the respective transmission duct.

The mechanical converter may be configured to cause a volumetric flow between the compression chamber and the transmission duct extending between the compression chamber and the flow passage that differs from a volumetric flow between the expansion chamber and the transmission duct extending between the expansion chamber and the flow passage.

The compression chamber and the expansion chamber may be configured to direct gas flows within the respective chambers in a direction generally parallel to a surface of the at least one diaphragm.

The at least one diaphragm may have a thickness profile across the diaphragm that may be selected to cause stress concentrations in the diaphragm to be reduced.

A static pressure associated with the working gas may be at least about 80 Bar.

An operating frequency associated with the periodic flow of the working gas may be at least about 300 Hertz.

At least a portion of at least one of the transmission ducts may include a plurality of ducts disposed to provide parallel fluid communication between the respective chamber and the flow passage of the thermal converter.

The flow passage of the thermal converter may further include a first heat exchanger portion in thermal communication with one of an external thermal energy source for receiving thermal energy and transferring the thermal energy to working gas flowing through the flow passage, and an external thermal energy sink for transferring thermal energy from the working gas flowing through the flow passage to the external thermal energy sink.

The thermal converter may include a thermal buffer for reducing heat transfer between the thermal converter and the mechanical converter, the thermal buffer being in fluid communication between the flow passage and the transmission duct extending between the expansion chamber and the flow passage.

During acoustic power flow between the compression chamber and the expansion chamber a standing wave component and a traveling wave component may be established within the acoustic power loop and the cross-sectional areas of the transmission ducts may be selected to cause the relative magnitudes of the standing wave component and traveling wave component to be apportioned to minimize overall losses in the apparatus.

The thermal converter may be disposed within a housing charged to a gas pressure approximately equivalent to a mean working pressure of the working gas.

The mechanical converter may be a first mechanical converter and may further include a second mechanical converter having at least one diaphragm defining a compression chamber and an expansion chamber within the second mechanical converter, the second mechanical converter being in fluid communication with the flow passage of the thermal converter through transmission ducts extending between the compression chamber of the second mechanical converter and the flow passage and between the expansion chamber of the second mechanical converter and the flow passage respectively, the transmission ducts completing a second acoustic power loop through the flow passage between the compression chamber and the expansion chamber of the second mechanical converter.

The first and second mechanical converters may be configured such that one of a) the expansion chamber of the first mechanical converter and the expansion chamber of the second mechanical converter includes a common expansion chamber extending between the at least one diaphragm of the first mechanical converter and the at least one diaphragm of the second mechanical converter, and b) the compression chamber of the first mechanical converter and the compression chamber of the second mechanical converter includes a common compression chamber extending between the at least one diaphragm of the first mechanical converter and the at least one diaphragm of the second mechanical converter.

At least a portion of at least one of the transmission ducts may include a plurality of ducts disposed to provide parallel fluid communication between the flow passage of the thermal converter and the respective chambers.

At least one of the transmission ducts may include a common portion providing fluid communication between the respective chambers and the flow passage of the thermal converter.

Resilient displacement of the at least one diaphragm associated with the first mechanical converter may generate periodic forces directed along a first axis and resilient displacement of the at least one diaphragm associated with the second mechanical converter may generate periodic forces directed along a second axis and the first and second mechanical converters may be disposed such that the first axis and second axis are generally oriented to cause the respective periodic forces to substantially cancel each other.

The first axis and second axis may be generally coaxially aligned.

The at least one diaphragm may include a compression chamber diaphragm and an expansion chamber diaphragm, the respective compression chamber and expansion chamber diaphragms being mechanically coupled to move substantially in unison to act as the diaphragm of the mechanical converter.

At least one of the transmission ducts may include an inner wall that flexes in response to the pressure oscillations within the acoustic power loop and may further include an outer wall disposed about the inner wall and defining a isolating volume between the inner and outer wall, the isolating volume being charged to a lower static pressure than the working gas pressure and being operable to attenuate sound/vibration generated by the flexing of the inner wall.

The thermal converter may include at least a first thermal converter and a second thermal converter each having an associated flow passage and the apparatus may further include a transmission duct extending between the respective flow passages of the first and second thermal converters and forming part of the acoustic power loop.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
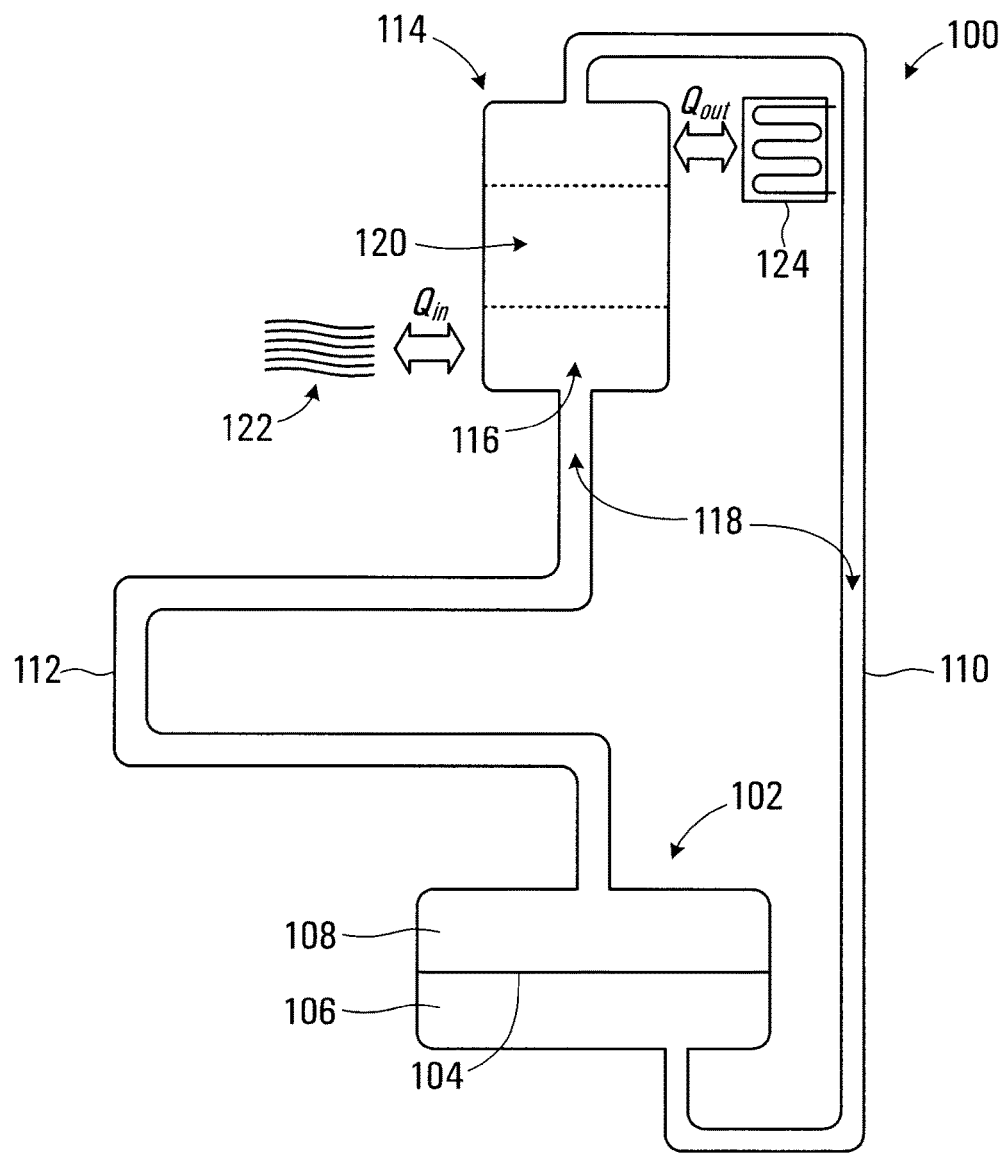
FIG. 1 is a schematic view of a thermoacoustic transducer apparatus in accordance with one embodiment of the invention.

Referring to FIG. 1, a thermoacoustic transducer apparatus according to a first embodiment of the invention is shown generally at 100. The apparatus 100 includes a mechanical converter 102 operable to provide power conversion between acoustic power and mechanical power. The mechanical converter 102 includes a diaphragm 104 defining a compression chamber 106 and an expansion chamber 108 within the mechanical converter. The diaphragm has an associated diaphragm surface area $A_s$.

The apparatus 100 also includes a thermal converter 114 including a flow passage 116. The flow passage 116 includes a regenerator portion 120 thermally coupled to provide power conversion between acoustic power and thermal power. The regenerator portion 120 has a regenerator flow area $A_R$.

The mechanical converter 102 is in fluid communication with the flow passage 116 of the thermal converter 114 through transmission ducts 110 and 112. The transmission duct 110 extends between the compression chamber 106 and the flow passage 116, while the transmission duct 112 extends between the expansion chamber 108 and the flow passage. The transmission ducts 110 and 112 complete an acoustic power loop 118 through the flow passage between the compression chamber 106 and the expansion chamber 108. The acoustic power loop 118 has a working volume for containing a working gas and is operable to facilitate acoustic power flow between the compression chamber and the expansion chamber. The working volume in the acoustic power loop 118 is thus made up of the volumes within the compression and expansion chambers 106 and 108, the volumes of transmission ducts 110 and 112, and the volume of the flow passage 116 in the thermal converter 114. In one embodiment the working gas in the working volume comprises helium at a static pressure $p_m$ of about 80 bar.

In one embodiment the transmission duct 110 and/or transmission duct 112 may have a cylindrical wall, but in other embodiments the ducts may have non-cylindrical walls. The transmission duct 110 has a first cross-sectional area $A_1$ and the transmission duct 112 has a second cross-sectional area $A_2$. In the embodiment shown, the transmission ducts 110 and 112 are shown as having a uniform cross-section along the length of the respective ducts, however in other embodiment the cross-section of the ducts may vary along their respective lengths.

During operation of the apparatus 100, the diaphragm 104 is operable to undergo resilient displacement to cause pressure oscillations within the acoustic power loop 118, and the working gas pressure within the working volume will thus swing between $p_m \pm |p|$, where $|p|$ is the differential pressure swing amplitude. When the diaphragm 104 is displaced so as to cyclically reduce and expand a volume of the compression chamber 106, the resulting compression and rarefaction in the working gas produces acoustic power which propagates through the transmission duct 110 to the thermal converter 114.

In one embodiment the regenerator portion 120 of the thermal converter 114 is configured to receive thermal energy from an external source 122 and to transfer thermal energy to an external sink 124, and to convert a portion of the thermal energy into acoustic energy for operation of the apparatus as a heat engine. The regenerator portion 120 of the thermal converter 114 then operates to convert thermal energy $Q_{in}$ provided from the external source 122 into acoustic energy, thereby amplifying the acoustic power traveling through the regenerator portion 120 of the thermal converter 114. The amplified acoustic power leaving the thermal converter 114 propagates along transmission duct 112 back to the mechanical converter 102, where it is received in the expansion chamber 108. Pressure oscillations due to the amplified acoustic power in the expansion chamber 108 are operable to cyclically displace the diaphragm 104, thereby transferring acoustic power back to the compression chamber 106. The diaphragm 104 may be coupled to transmit mechanical power to an external system (not shown in FIG. 1). The amplification of acoustic power in the thermal converter 114 thus provides sufficient power for sustaining periodic movement of the diaphragm 104, while also providing useful mechanical output power. The process described above operates at a natural frequency associated with the apparatus 100.

Alternatively for operation of the apparatus as a heat pump, mechanical power is transmitted to the diaphragm 104 to cause the cyclic displacement of the diaphragm. The regenerator portion 120 of the thermal converter 114 is configured to receive acoustic energy generated within the apparatus 100 and to convert the acoustic energy into a transfer of thermal energy from the external source 122 to external sink 124, at higher temperature than the temperature of the external source 122.

The regenerator portion 120 of the thermal converter 114 has an associated regenerator flow area $A_R$, and in the embodiment shown the diaphragm surface area $A_S$ is greater than the regenerator flow area. In this embodiment, the regenerator flow area $A_R$ is also greater than the first and second cross-sectional areas $A_1$ and $A_2$ of the respective transmission ducts 110 and 112.

In other embodiments the flow passage 116 of the thermal converter 114 may include a plurality of regenerator portions 120 configured for parallel flow and the regenerator flow area $A_R$ may include an overall area associated with the plurality of the regenerator portions. Similarly, the mechanical converter 102 may include a plurality of mechanical converters configured in parallel and the diaphragm surface area $A_S$ may include an overall diaphragm surface area associated with the plurality of mechanical converters.

The acoustic power loop 118 is further configured to cause at least one location along the loop to have pressure oscillations that have an anti-phase relation to pressure oscillations in the mechanical converter 102. The acoustic power loop 118 may be configured such that pressure oscillations have an approximately anti-phase relation to pressure oscillations in the mechanical converter 102 within the regenerator portion 120 of the thermal converter 114, such that viscous losses within the regenerator are reduced.

The transmission ducts 110 and 112 act as transmission lines carrying the acoustic power from the compression chamber 106 to the regenerator portion 120 of the thermal converter 114 and back to the expansion chamber 108. In general, acoustic energy waves propagating through a gas-filled duct will experience a phase change that depends on the constitution and temperature of the gas, and on the cross-sectional area of the duct. If the duct has a bore of varying cross-sectional area then the rate of change of pressure phase will vary along the duct. Acoustic energy waves propagating through a duct will thus experience a change of oscillating pressure phase between an entrance and an exit of the duct.

In one embodiment, the transmission duct 110 and transmission duct 112 each have respective lengths selected to cause a pressure oscillation phase change of about 360 degrees along the acoustic path between the compression chamber 106 and the expansion chamber 108.

It should be readily appreciated that the respective lengths of the transmission ducts 110 and 112 may also be increased to provide an overall phase change along the transmission ducts that corresponds to the above phase change ranges while including an additional 360 degree phase change. As an example, the lengths of the transmission ducts 110 and 112 may be selected to provide a phase change of about 720 degrees, which apart from additional duct losses would result in the same pressure oscillation phase change between the compression chamber 106 and the expansion chamber 108. The transmission ducts 110 and 112 may thus have respective lengths that are selected to cause an initial phase change of about 360 degrees between pressure oscillations in the compression chamber 106 and pressure oscillations in the expansion chamber 108, and at least one additional 360 degree phase change such that an overall phase change through the acoustic power loop 118 has the same effect as the initial phase change. The additional length of the transmission ducts 110 and 112 may facilitate positioning the mechanical converter 102 remotely from the thermal converter 114 by including one or more multiples of 360 degree pressure phase change along the acoustic power loop 118.

The pressure oscillations within the acoustic power loop 118 have associated working gas flow oscillations and the transmission ducts 110 and 112 may have respective lengths selected to dispose the flow passage 116 of the thermal converter 114 proximate a location within the acoustic power loop where the flow oscillations have a flow velocity that is close to a minimum flow velocity. In one embodiment the apparatus 100 may be configured such that a frequency of the pressure oscillations is about 500 Hz. For helium working gas at a temperature of about 50° C., the wavelength of sound at 500 Hz operating frequency is about 2.1 meters, and under these conditions the length of each of the transmission ducts 110 and 112 may be about 1 meter. The apparatus 100 may thus be configured such that the mechanical converter 102 and thermal converter 114 are spaced apart, which is advantageous when the apparatus is required to be configured for operation in conjunction with a furnace or other equipment that provides the external source 122 and/or external sink 124.

Mechanical Converter

Figure 2:
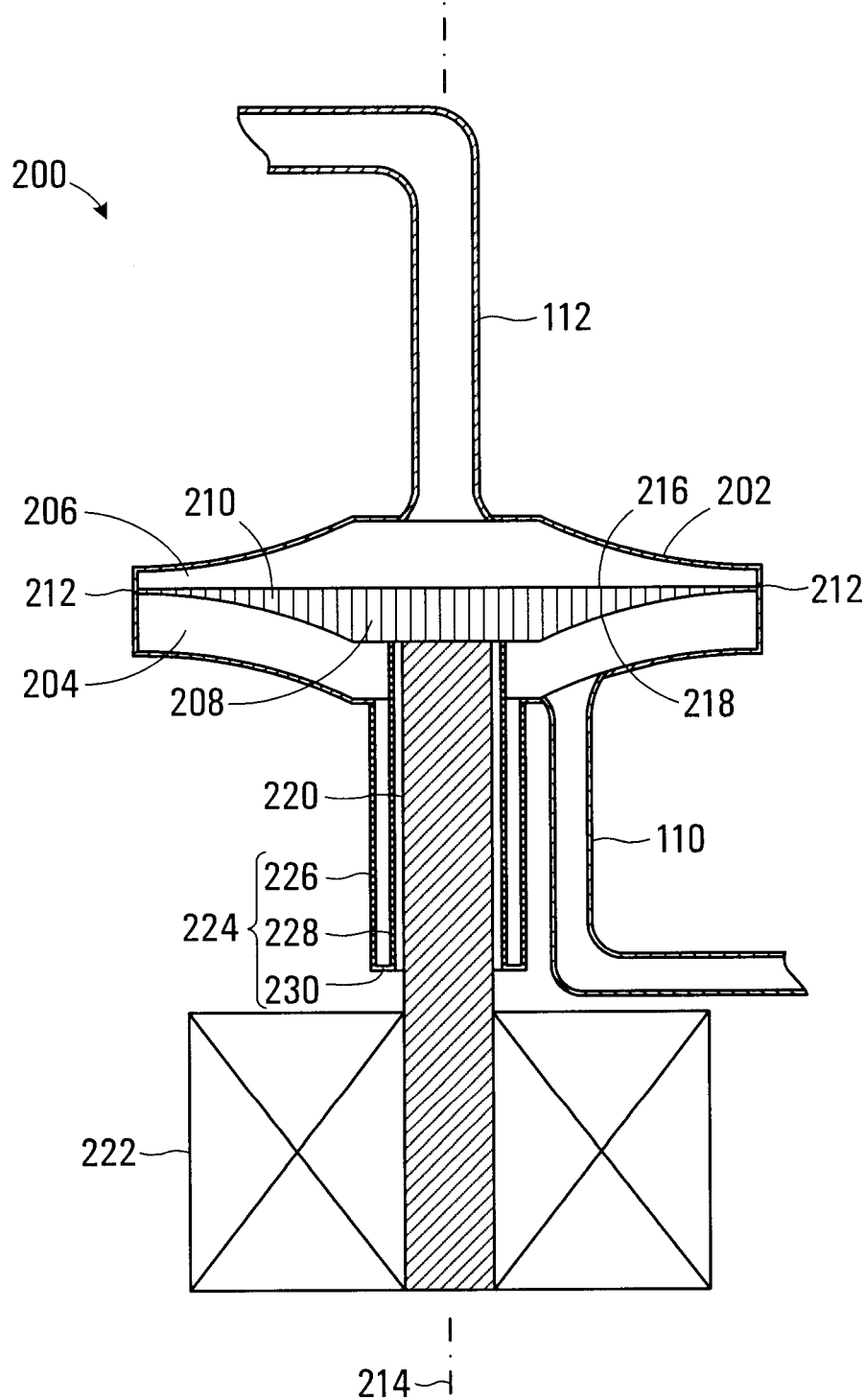
FIG. 2 is a cross-sectional schematic view of an embodiment of a mechanical converter for implementing the apparatus shown in FIG. 1.

A schematic cross sectional view of an embodiment for implementing the mechanical converter 102 is shown generally at 200. Referring to FIG. 2, the mechanical converter 200 includes a housing 202 enclosing a compression chamber 204 and an expansion chamber 206. The compression chamber 204 and expansion chamber 206 are separated by a diaphragm 208. In this embodiment the diaphragm 208 comprises a resilient wall 210 supported at a periphery 212 of the housing 202 and configured to facilitate displacement in a direction aligned with a central axis 214 of the mechanical converter 200. The diaphragm 208 has a lower surface 218, which during displacement of the wall causes a volume of the compression chamber 204 to be varied. Similarly, the diaphragm 208 has an upper surface 216, which during displacement of the wall causes a volume of the expansion chamber 206 to be varied. The wall 210 of the diaphragm 208 has a thickness profile across the diaphragm that is selected to cause stress concentrations in the diaphragm to be reduced.

In the schematic view of FIG. 2, spacing between elements of the mechanical converter 200 has been increased for illustrative purposes. In practice, a longitudinal extent of the compression and expansion chambers 204 and 206 along the axis 214 may only be in the region of about 1 mm and a corresponding displacement of the diaphragm 208 may have a peak amplitude of about 200 μm, for example. The resilient wall 210 of the diaphragm 208 may be fabricated from steel, which is capable of providing an infinite fatigue life under these operating conditions.

The mechanical converter 200 further includes an input/output shaft 220. In this embodiment the shaft 220 is coupled between the diaphragm 208 and an external energy system 222. During operation of the apparatus 100, the diaphragm 208 undergoes periodic displacement for coupling energy between the mechanical converter 200 and the external energy system 222. When the mechanical converter 200 is configured to operate as part of a heat engine, the external energy system 222 may comprise an electrical generator for converting mechanical energy into electrical energy. For example, in the embodiment shown the external energy system 222 may comprise a linear alternator, which generates an alternating current. Alternatively, when the mechanical converter 200 is configured to operate as a heat pump, the external energy system 222 may comprise a prime mover such as an electro-mechanical actuator for imparting a mechanical driving force to the diaphragm 208.

The mechanical converter 200 also includes a mechanical spring 224 coupled between the diaphragm 208 and the housing 202. In this embodiment, the mechanical spring 224 includes a resilient outer cylindrical wall portion 226 and a resilient inner cylindrical wall portion 228 coaxially disposed and joined by an annular wall portion 230 to form a folded cylindrical tube spring. The outer cylindrical wall portion 226 is connected to the housing 202 and the inner cylindrical wall portion 228 is connected to the diaphragm 208 and the tube spring is configured to elastically deform in a direction generally aligned with a central axis 214. In this embodiment the inner, outer, and annular wall portions 226, 228, and 230 of the mechanical spring 224 are also operable to provide a seal for containing working gas within the compression chamber 204 while facilitating displacement of the diaphragm 208.

The compression chamber 204 of the mechanical converter 200 is in fluid communication with the transmission duct 110 and the expansion chamber 206 is in fluid communication with the transmission duct 112. In the embodiment shown in FIG. 2, the transmission duct 112 is coaxially disposed such that gas flows within the expansion chamber 206 are symmetrically oriented about the central axis 214. While symmetrically oriented flows have the advantage of being simpler to characterize using a mathematical model, in other embodiments the thermoacoustic transducer apparatus 100 may have a non-symmetric flow. In the embodiment of FIG. 2, the transmission duct 110 is shown as being offset from the central axis 214, but in other embodiments the transmission duct may be offset even further toward or at an edge of the compression chamber 204. In yet another embodiment, the transmission duct 110 may include a plurality of offset transmission ducts to minimize local flow concentration and local losses. The transmission duct 110 may thus comprise a plurality of duct lengths in communication with the compression chamber 204 and disposed about the central axis 214. For example, gas flow may be directed through a manifold disposed proximate the periphery 212 of the compression chamber 204 to the transmission duct 110. The manifold may include multiple branches for symmetrically directing gas flow between the periphery 212 and transmission duct 110, thus causing path lengths associated with the flows to have a generally similar length. Similarly, in the expansion chamber 206, gas flow may also be directed via a manifold disposed proximate the periphery 212 of the chamber to the transmission duct 112 and the manifold may include multiple branches for symmetrically directing gas flow between the periphery 212 and the transmission duct 112.

The mechanical converter 200 shown in FIG. 2 is configured for significantly different flow than conventional inline piston or diaphragm thermoacoustic transducer systems. In such systems flow is generally perpendicular to the piston or diaphragm surface. In the embodiments disclosed herein, the resilient wall 210 of the diaphragm 208 provides a very limited displacement and as a result the compression and expansion chambers 204 and 206 are substantially planar and have a radius to height ratio that may be in the region of 100:1. The mechanical converter has high acoustic impedance (i.e. large pressure oscillations in proportion to the flow oscillations within the chambers 204 and 206). Working gas flow within the chambers 204 and 206 is thus predominantly along the surface of the diaphragm 208 generally parallel to the upper surface 216 and lower surface 218 the diaphragm.

The compression and expansion chambers 204 and 206 also provide an additional acoustic compliance in the acoustic power loop 118 that affects the flows between the chambers and the respective transmission ducts 110 and 112. In effect a larger flow into either of the chambers 204 and 206 may be accommodated by configuring the respective chamber to provide a larger acoustic compliance through increased chamber volume. For an increased chamber volume a larger flow is required to charge the chamber to a given pressure. Also, flows into the chambers do not need to be completely in phase with the velocity of the diaphragm 208. Configuration of the compression and expansion chambers 204 and 206 thus facilitates independent adjustment of flows between the chambers and the respective transmission ducts 110 and 112 by changing the height of the respective chambers.

Thermal Converter

Figure 3:
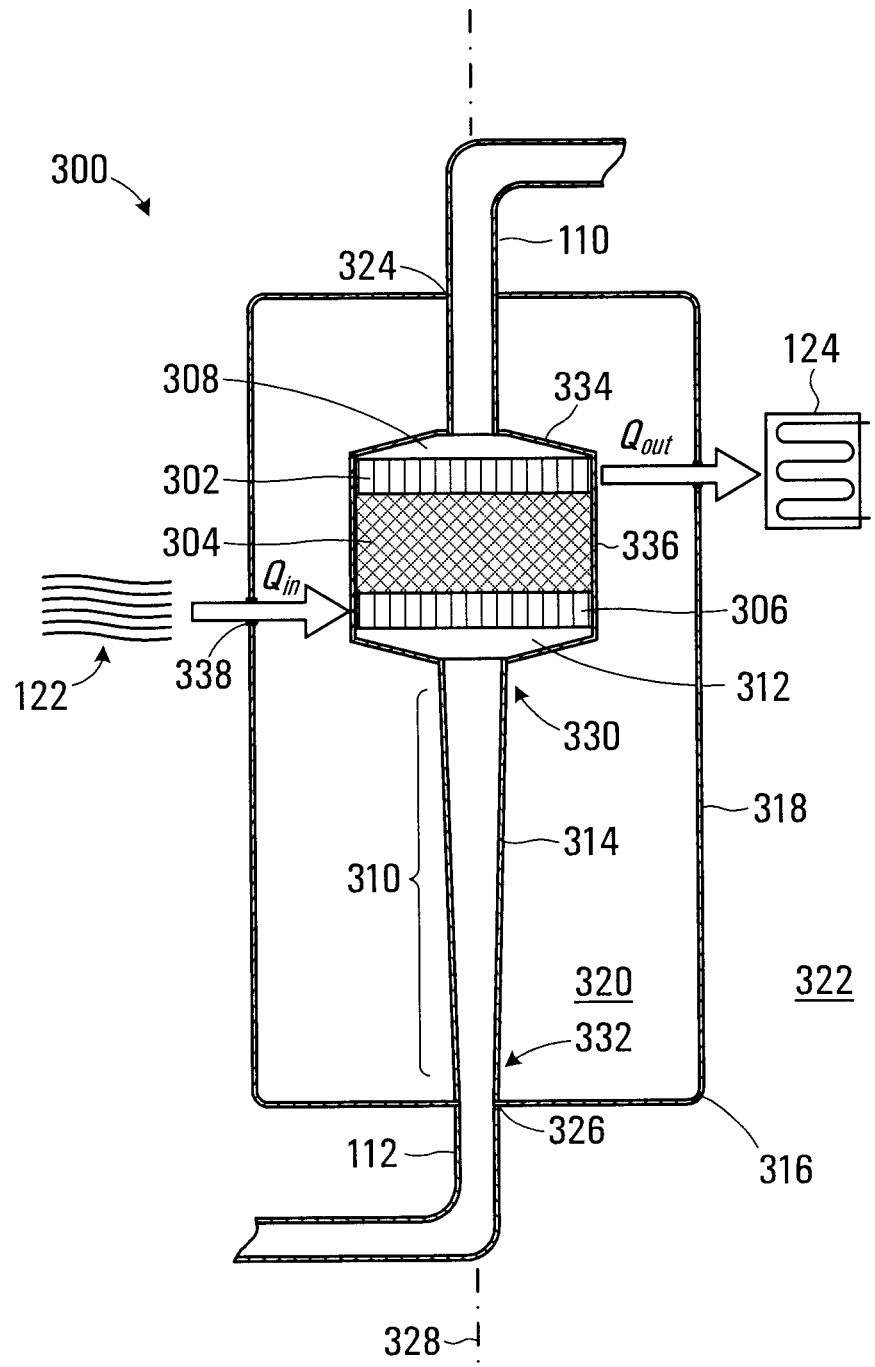
FIG. 3 is a cross-sectional schematic view of an embodiment of a thermal converter for implementing the apparatus shown in FIG. 1.

Referring to FIG. 3, an embodiment for implementing the thermal converter 114 in FIG. 1 is shown generally at 300. In this embodiment, the thermal converter 300 includes a first heat exchanger 302, a regenerator 304, and a second heat exchanger 306. The regenerator 304 extends between and is in fluid communication with the first heat exchanger 302 and the second heat exchanger 306. The first heat exchanger 302 is in fluid communication with the transmission duct 110 via a first plenum 308. The second heat exchanger 306 is operable to receive thermal energy from the external source 122 and thermal energy $Q_{out}$ is removed from the first heat exchanger 302 and transferred to the external sink 124. General considerations for configuring the first heat exchanger 302, regenerator 304, and second heat exchanger 306 are disclosed in "Thermoacoustics," G. W. Swift, 2002 Acoustical Society of America, Melville N.Y., In this embodiment, the thermal converter 300 also includes a thermal buffer 310 in fluid communication between second plenum 312 and the transmission duct 112. In this embodiment the thermal buffer 310 includes a duct having a profiled wall 314 that is shaped to reduce convective heat transfer through circulating gas flows within the duct during operation of the apparatus 100.

The thermal converter also includes a housing 316 having walls 318, which may be fabricated from conventional steel. The housing 316 defines an insulating volume 320 that surrounds the first heat exchanger 302, regenerator 304, second heat exchanger 306, and thermal buffer 310 and extends to the walls 318 of the housing. The first heat exchanger 302, regenerator 304, and second heat exchanger 306 are enclosed within a regenerator housing 334 having walls 336. The regenerator housing 334 provides fluid connections to the transmission duct 110 and the thermal buffer 310 and the first and second plenums 308 and 312 are defined within the walls 336 of the regenerator housing.

During operation of the apparatus 100, portions of the regenerator 304, second heat exchanger 306, and thermal buffer 310 generally operate at a temperature differential with respect to an ambient temperature $T_a$ of an environment 322 surrounding the housing 316. For example, when operating the apparatus 100 as a heat engine, the thermal energy received at the second heat exchanger 306 causes the temperature of at least the second heat exchanger 306, portions of the regenerator 304, and a portion of the thermal buffer 310 to be elevated above an ambient temperature $T_a$. The insulating volume 320 may be filled with an insulating material, such as a porous ceramic material, which acts to insulate components in the thermal converter having temperatures different than the ambient temperature $T_a$ of the environment 322. The insulating volume 320 and thermal buffer 310 thus operate to reduce heat transfer to the walls 318 of the housing 316, such that the walls remain at a temperature close to the ambient temperature $T_a$. In one embodiment, the insulating volume 320 may be charged with an insulating gas to approximately the same static pressure as the working gas static pressure $p_m$. Advantageously, charging the insulating volume 320 to generally the same static pressure as the working gas reduces stresses on the profiled wall 314 of the thermal buffer, the walls 336 of the regenerator housing 334, and walls of the transmission duct 110. Furthermore, the stress on these walls is then purely cyclical and high temperature creep is then no longer a concern. This allows these walls to be substantially thinner, thereby reducing heat conduction along the walls. In one embodiment, the gas used to charge the insulating volume 320 may be an insulating gas such as argon rather than the working gas, which will further reduce the heat transfer to the walls 318 of the housing 316. During operation of the apparatus 100 the housing 316 remains at a temperature near an ambient temperature of the environment 322 and even though the static pressure in the insulating volume 320 acts on the walls 318, creep is less of a concern due to the near ambient temperature operation of the walls.

The transmission duct 110 feeds through the housing 316 at a first port 324. During operation of the apparatus 100, a temperature of the gas in the compression chamber 204 and in the transmission duct 110 is not significantly elevated above ambient temperature and thus the first port 324 is not required to withstand a significant temperature differential. The transmission duct 112 feeds through the housing 316 at a second port 326, which is also not required to withstand a significant temperature differential since the insulating volume 320 reduces heat transfer to the walls 318 of the housing 316 and the thermal buffer 310 reduces heat transfer to the transmission duct 112.

Advantageously when the apparatus 100 is configured as a heat engine most of the components of the thermal converter 300 that operate at elevated temperature are thermally insulated within the housing 316 and the operating temperature of walls 318 of the housing 316 are not significantly elevated over ambient temperature $T_a$. The thermal buffer 310 also reduces heat transfer along the transmission duct 112 to the expansion chamber 108. In this embodiment, the thermal converter includes a temperature isolating feedthrough 338 for receiving thermal energy $Q_{in}$ from the external source 122, which when operating as a heat engine is at a substantially higher temperature than an ambient temperature of the environment 322. In one embodiment, the thermal energy $Q_{in}$ could be provided through a hot heat exchange fluid loop or through combustion of a fuel gas, for example (not shown). The second heat exchanger 306 receives thermal energy $Q_{in}$ from the external energy source and transfers heat to working gas flowing through the second heat exchanger into or out of the regenerator 304.

The regenerator 304 alternatively receives thermal energy from working gas passing through the regenerator and delivers thermal energy to the working gas. The regenerator 304 may be fabricated from a matrix material having a flow channel radius selected to provide sufficiently low flow friction losses while providing for efficient heat transfer between the gas flowing through the regenerator and the matrix material. The regenerator matrix material should have a low thermal conductivity in the direction of the axis 328 for reducing heat conduction through the regenerator to the first heat exchanger 302. Suitable matrix materials for the regenerator 304 may include porous materials such as porous ceramic or packed spheres, or materials having discrete flow channels such as a micro capillary array. Alternatively, a stacked wire screen or wound wire regenerator, may also be used. Some suitable regenerator matrix materials are described in U.S. Pat. No. 4,416,114 to Martini, which is incorporated herein by reference in its entirety.

The first heat exchanger 302 receives heat from working gas flowing through the first heat exchanger and the heat is removed from the thermal converter by an external heat exchange system such as a liquid cooling loop (not shown), which would be in thermal communication with the first heat exchanger.

The thermal buffer 310 is configured to maintain a temperature-stratified column of working gas that allows the transmission of acoustic power in the working gas through the thermal buffer 310, while minimizing parasitic heat transfer between an end 330 of the thermal buffer proximate the second plenum 312 and an end 332 of the thermal buffer proximate the second port 326. Parasitic heat transfers would include heat conduction in the walls 314 of the thermal buffer 310, gravity driven convective flow, acoustically driven streaming, and thermoacoustic bucket brigade heat transfer along the walls of the thermal buffer. Such parasitic heat transfers are further described in Swift (referenced above). For a heat engine, the end 330 would be at an elevated temperature over the end 332, which is in thermal communication with the walls 318 of the housing 316 and would thus generally remain at a temperature near an ambient temperature of the environment 322. In other embodiments, the thermal buffer 310 may include a secondary heat exchanger proximate the end 332 for thermally anchoring the working gas temperature at end 332 at near the housing temperature. For a heat pump implementation of the apparatus 100, the end 330 would be at a lower temperature than the end 332.

The thermal buffer 310 may include a flow straightener (not shown) between the second plenum 312 and end 330 for reducing Rayleigh streaming within the thermal buffer at the transition between the second plenum and the thermal buffer. For the embodiment shown a flow straightener should not be required at the transition between the thermal buffer 310 and the transmission duct 112, since there is no abrupt change in diameter or direction of the thermal buffer and hence no jetting of the gas flow at this transition.

When operating the apparatus 100 as a heat engine, the end 330 of the thermal buffer 310 may have to withstand high operating temperatures, in which case at least a portion of the thermal buffer would generally be fabricated from a high temperature material, such as a ceramic material, refractory metal, or high nickel content super alloy. Advantageously, since the thermal buffer 310 is disposed inside the housing 316 which may be changed to a pressure $p_m$, the thermal buffer is only subjected to the differential pressure amplitude $\pm|p|$ and not the full static pressure $p_m$, thus significantly reducing high temperature creep effects on the thermal buffer material.

In general the profile of the walls 314 of the thermal buffer is selected to promote the temperature-stratified column of working gas by suppressing acoustically driven streaming. Determination of a specific profile for the profiled wall 314 may be in accordance with calculations provided for a tapered pulse tube disclosed in U.S. Pat. No. 5,953,920 to Swift et al., which is incorporated herein by reference in its entirety. The profiled wall 314 of the thermal buffer 310 shown in FIG. 3 has a cross-sectional dimension that reduces between the end 330 and the end 332. In the embodiment shown the cross-sectional dimension changes in generally linear proportion along the profiled wall 314 of the thermal buffer 310. In other embodiments, the cross-sectional dimension may change non-linearly or may even increase, depending on the specific flow conditions and temperature gradients within the thermal converter 300.

Inclusion of the thermal buffer 310 imposes a constraint on the orientation of the thermal converter 300, in that the thermal buffer must be oriented with a hot end of the two ends 330 and 332 being upwardly directed to reduce gravity driven convection. Such gravity driven convection would generally result in a significant parasitic heat transfer between the ends 330 and 332 of the thermal buffer 310.

Transmission Ducts

The mechanical converter 200 and thermal converter 300, when connected by the transmission ducts 110 and 112, form a thermoacoustic transducer apparatus such as that shown at 100 in FIG. 1. The transmission ducts 110 and 112 are generally configured to provide a desired performance and operating efficiency of the apparatus. In the embodiments disclosed herein, the acoustic power loop 118 is configured to establish both a standing wave component and a traveling wave component. The standing wave component is superimposed on the travelling wave and has out of phase pressure and flow amplitudes that constrain the length of the transmission ducts 110 and 112, but do not contribute to acoustic power flow through the acoustic power loop 118. At the same time, the travelling wave component is responsible for power flow through the acoustic power loop 118, but remains substantially unaltered by passage through the ducts, except for a slight decrease in amplitude due to the additional viscous and relaxation losses within the ducts. The addition of the transmission ducts 110 and 112 facilitates adjustment of a ratio between the standing wave component and the travelling wave component such that acoustic losses in the mechanical converter 200 and thermal converter 300 are reduced as a fraction of output power. However, the transmission ducts 110 and 112 themselves introduce additional losses. Selection of a length and cross sectional area of the transmission ducts 110 and 112 involves balancing of losses in the ducts against the reduction of losses in the mechanical and thermal converters 200 and 300 within the acoustic power loop 118 and against structural constraints to achieve an overall desired performance of the apparatus.

Periodic movement of the diaphragm 208 results in some portion of volume of the compression chamber 204 and expansion chamber 206 being swept by the diaphragm elements, while remaining portions of the working volume within the respective chambers, the transmission ducts 110 and 112, and the thermal converter 300 represent an unswept volume portion of the working volume. Conventional Stirling engines are one example of a thermoacoustic transducer that is generally configured to minimize the unswept volume proportion to increase an overall compression ratio of the apparatus, thereby increasing operating efficiency. Accordingly, in a conventional configuration any duct length between the mechanical converter 200 and thermal converter 300 would be minimized or even eliminated to reduce unswept volume. Inclusion of additional lengths of duct such as the transmission ducts 110 and 112 thus significantly increases the unswept volume proportion. However the overall length of the transmission ducts 110 and 112 may be selected such that the effect of the additional unswept volume of the transmission ducts and other unswept portions of the working volume are substantially eliminated apart from additional viscous and relaxation losses associated with inclusion of the transmission ducts 110 and 112.

For example, if the transmission ducts 110 and 112 have a length selected to cause a phase change of about 360 degrees through the acoustic power loop 118, then the phase relationship between pressure and flow oscillations within the compression chamber 204 and expansion chamber 206 would be essentially unchanged when compared to a conventionally configured apparatus having a minimized unswept volume.

In one embodiment, the length of the transmission ducts 110 and 112 may be slightly reduced to compensate not only for the added unswept volume in the transmission ducts, but also for other unswept volumes within the mechanical converter 200 and thermal converter 300. For example the overall lengths of the transmission ducts 110 and 112 may be selected to cause a phase change of less than 360 degrees, which would also compensate for these other unswept volumes within the working volume. Accordingly in this embodiment most of the unswept volume can be effectively removed from the acoustic power loop 118 thus making it possible to provide for an optimal compression ratio irrespective of the actual working volume thereby increasing the efficiency and specific power produced by the apparatus. As may be readily appreciated, increasing the compression ratio by physically removing unswept volumes is particularly difficult and severely constrains engine architecture. Advantageously, in this embodiment, unswept volume is effectively cancelled through appropriate selection of the length of the transmission ducts 110 and 112 rather than being physically removed.

The specific embodiment of the mechanical converter 200 shown in FIG. 2 effectively corresponds to an alpha-configuration Stirling engine, in which the compression and expansion chambers each have a diaphragm (or piston) and the dual diaphragms are typically mechanically linked so as to cause a phase difference between displacements of the respective diaphragms. In the mechanical converter 200, the single diaphragm 208 replaces the linked diaphragms of the conventional alpha-configuration Stirling and the necessary phase difference is provided through selection of the lengths of the transmission ducts 110 and 112. For example, in one embodiment, the transmission duct 110 and transmission duct 112 have respective lengths selected to cause a phase difference between pressure oscillations in the compression chamber 204 and pressure oscillations in the expansion chamber 206 of at least about 285 degrees and less than about 345 degrees. Conveniently, a range of 285 degrees and less than about 345 degrees also substantially falls within a phase change range that addresses the unswept volume, as described above. Advantageously, the inclusion of transmission ducts 110 and 112 thus facilitates the use of a single diaphragm 208, while simplifying the structural configuration of the mechanical converter.

One significant loss within the acoustic power loop 118 occurs within the matrix of the regenerator 304 of the thermal converter 300, which has narrow flow channel radius that results in increased viscous flow losses through the regenerator. The acoustic power at the any location along the acoustic power loop 118 may be expressed by the following relation:

$$P_a = \tfrac{1}{2}\mathrm{Re}[p \cdot \tilde{U}], \qquad \text{Eqn 1}$$

where:

P$_a$ is the acoustic power;

p is the pressure phasor; and

Ũ is the complex conjugate of the volumetric flow phasor.

Due to the standing wave within the acoustic power loop 118, the relative amplitudes of the pressure oscillations (p) and flow oscillations (Ũ) vary through the power loop. In the embodiment of the mechanical converter 200 shown in FIG. 2, the diaphragm 208 is relatively stiff and is configured for small operating displacements and as such generates relatively low flow oscillation amplitude within the compression and expansion chambers 204 and 206 and relatively high pressure oscillation amplitude. As disclosed above, the acoustic power loop is configured to cause at least one location along the acoustic power loop 118 to have pressure oscillations that have an anti-phase relation to pressure oscillations in the mechanical converter 200. The location where this anti-phase relation occurs thus corresponds to a location of high pressure oscillation amplitude and low flow oscillation amplitude. In this embodiment the regenerator 304 of the thermal converter 300 is disposed proximate this location, since viscous losses are proportional to the square of the flow oscillation amplitude. Accordingly, disposing the thermal converter proximate the location along the acoustic power loop 118 where pressure oscillations have an approximately anti-phase relation to pressure oscillations in the mechanical converter 200 may at least partially compensate for the increased viscous and relaxation losses introduced by inclusion of the transmission ducts 110 and 112.

In general, the first cross-sectional area A$_1$ of the transmission duct 110 and the second cross-sectional area A$_2$ of the transmission duct 112 are selected to cause the relative magnitudes of the standing wave component and traveling wave component to be apportioned to minimize overall losses in the apparatus.

The resilient wall 210 of the diaphragm 208 is formed as a relatively thick and stiff steel flexure configured to be mechanically resonant at the operating frequency of the thermoacoustic transducer apparatus. For long operating lifetime the resilient wall 210 is designed such that flexure stresses remain below an infinite fatigue maximum stress associated with the material of the wall. Volumetric flows caused by oscillating displacement of the diaphragm 208 are proportional to the surface area A$_s$ and the displacement amplitude of the diaphragm which is generally small resulting in generally low flow amplitudes within the compression chamber 204 and expansion chamber 206. Accordingly, for a given acoustic power, frequency, diaphragm area A$_s$, and diaphragm displacement, relatively high pressure oscillation amplitudes are required in the compression chamber 204 and expansion chamber 206. The impedance of the compression chamber 204 and expansion chamber 206 is proportional to the ratio of pressure amplitude to flow amplitude, causing the compression and expansion chambers of the mechanical converter to have high acoustic impedance.

The standing wave component of the acoustic power flow is established by selection of the dimensions of the transmission ducts 110 and 112 so as to cause an acoustic impedance mismatch between the mechanical converter 200, thermal converter 300, and the transmission ducts. A duct has a characteristic impedance given by:

$$Z_t = \frac{\rho_m c_0}{A_{ff}} \qquad \text{Eqn 2}$$

where $\rho_m$ is the density of the working gas, c$_0$ is the velocity of sound in the working gas, and A$_{ff}$ is the free flow cross-sectional area of the duct. Viscous and relaxation losses within the duct reduce with increasing duct area A$_{ff}$ since a greater acoustic power can then be transmitted at lower pressure oscillation amplitude and correspondingly increased volumetric flow oscillation amplitude. However, as disclosed above, viscous losses are greatest with the regenerator 304, and it is thus desirable to cause some intentional impedance mismatch between the mechanical converter 200, thermal converter 300 and the transmission ducts 110 and 112 to establish the location along the acoustic power loop 118 where pressure oscillations have an anti-phase relation to pressure oscillations in the mechanical converter 200 for reducing regenerator viscous losses. The addition of the standing wave component reduces losses in the regenerator 304 by increasing p and reducing Ũ while leaving the acoustic power P$_a$ generally unchanged (in Eqn 1 above). Relaxation losses that are proportional to the square of the pressure amplitude |p| are almost absent in the regenerator 304, and are thus not significantly increased by the standing wave component. However viscous losses are proportional to the square of volumetric flow and are significantly decreased. Accordingly, in the embodiments shown the first cross-sectional area A$_1$ of the transmission duct 110 and the second cross-sectional area A$_2$ of the transmission duct 112 are at least about 10 times less than the surface area A$_s$ of the diaphragm 208. The first cross-sectional area A$_1$ of the transmission duct 110 may also be less then the second cross-sectional area A$_2$ of the transmission duct 112, since the transmission duct 112 is disposed after the thermal converter 300 in the acoustic power loop 118 and must thus accommodate a higher power flow than the transmission duct 110.

In one embodiment the area A$_1$ of the transmission duct 110 may be about half of the area A$_2$ of the transmission duct 112. For example, the area A$_2$ may be about 7 cm$^2$, the area A$_1$ may be about 3.5 cm$^2$, and the surface area of the diaphragm A$_s$ may be about 80 cm$^2$. The regenerator 304 may have a regenerator flow area A$_R$ of about 70 cm$^2$, which is less then the area A$_s$ and greater than the areas A$_1$ and A$_2$.

When combined with the relatively high operating frequency (i.e. above 300 Hz, and typically 500 Hz) for the thermoacoustic transducer apparatus disclosed herein, the reduction in the duct areas A$_1$ and A$_2$ in comparison to the areas A$_s$ and A$_R$ of the mechanical converter 200 and thermal converter 300 provides additional advantages over conventional lower frequency thermoacoustic transducers. High frequency operation reduces the lengths of the transmission ducts 110 and 112 for a desired phase change between compression and expansion chambers 204 and 206 and also provides a corresponding reduction in duct losses and duct mass. The reduced duct areas A$_1$ and A$_2$ permits the wall thickness to be reduced while still providing sufficient thickness to withstand the hoop stress caused by the pressure differential between the working gas pressure p$_m$ and the lower pressure outside the ducts. Wall thickness for a circular cross-section duct generally scales with the duct radius for a given working pressure p$_m$ but the duct mass scales with the square of duct radius. Accordingly, for the thermoacoustic transducer apparatus embodiments disclosed herein, the mass of the transmission ducts 110 and 112 represents a substantially smaller proportion of the overall mass of the apparatus than for comparative thermoacoustic transducer configurations operating at low frequency and with large duct diameters.

The inclusion of transmission ducts 110 and 112 provides several advantages and satisfies constraints associated with configuring thermoacoustic transducers. For example, the transmission ducts 110 and 112 address unswept volume issues, provide for optimal location of the thermal converter 300 along the acoustic power loop 118, and facilitate separation of the mechanical converter 200 from the thermal converter. For the Alpha-type mechanical converter embodiment shown in FIG. 2, the transmission ducts 110 and 112 also provide the necessary phase shift between pressure oscillations in the compression and expansion chambers 204 and 206. Additionally, configuration of the apparatus to operate at relatively high frequencies, reduces the necessary length of the transmission ducts 110 and 112 and therefore the associated losses.

In one embodiment the operating frequency of the transducer apparatus is selected such that losses in the transmission ducts 110 and 112 are less than losses in the regenerator 304. In one exemplary embodiment the operating frequency is at least about 300 Hz and may be about 500 Hz, or may be higher than 500 Hz.

Operating Simulation

Figure 4:
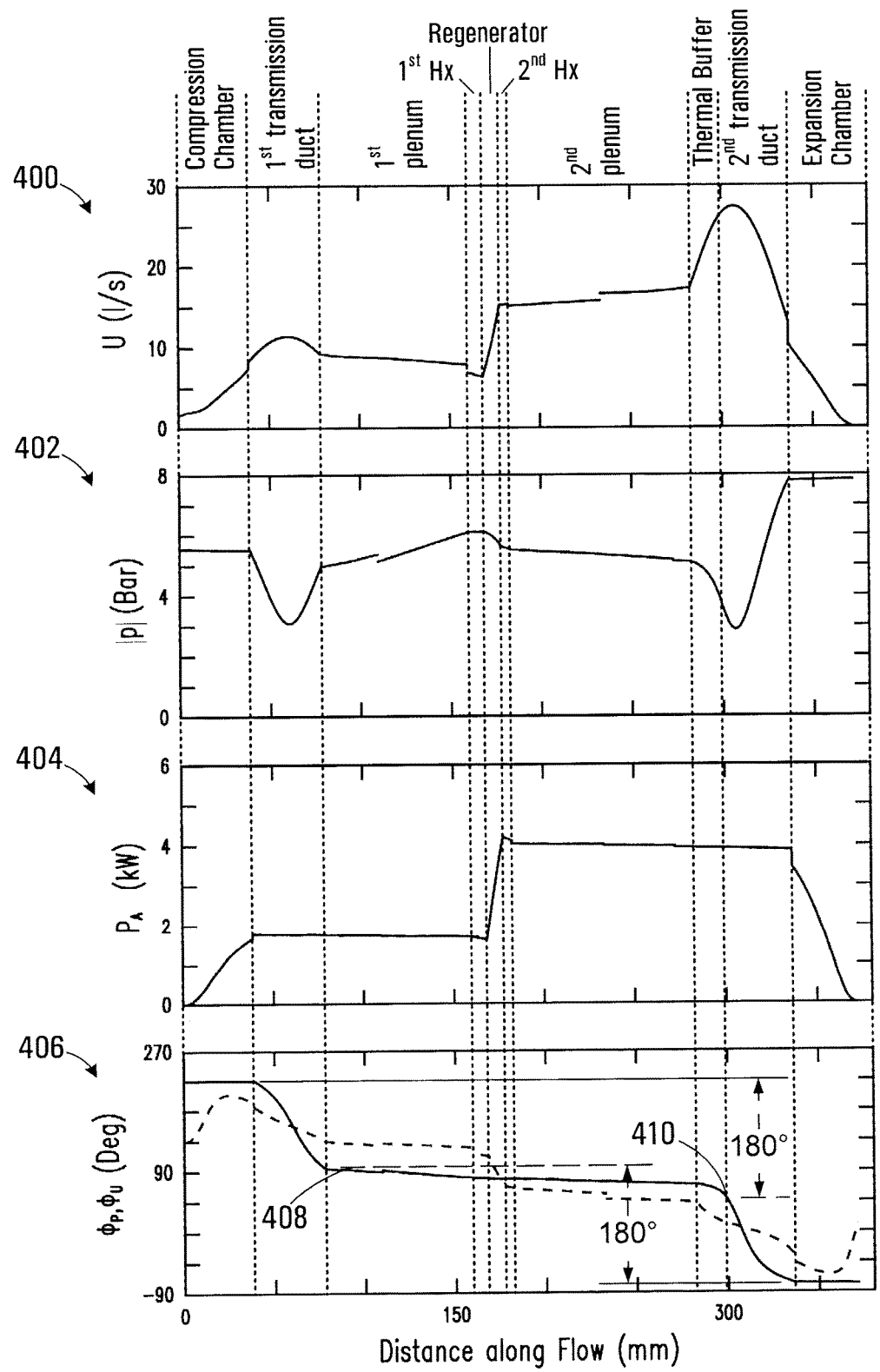
FIG. 4 is a series of graphs representing results of an operating simulation of the apparatus shown in FIGS. 1-3.

The operation of the thermoacoustic transducer apparatus as a heat engine is further described with further reference to FIG. 4, which includes results of computer simulations for a thermoacoustic transducer apparatus such as that shown in FIGS. 1-3. The simulation results are depicted as a series of graphs 400, 402, 404, and 406 in which the x-axis represents locations along the acoustic power loop 118 through the apparatus extending from the periphery 212 of the compression chamber 204, through the compression chamber, through the transmission duct 110, first plenum 308, first heat exchanger 302, regenerator 304, second heat exchanger 306, second plenum 312, thermal buffer 310, transmission duct 112, and through the expansion chamber 206 to the periphery 212. Since the end to end length of the acoustic power loop 118 is dominated by the length of the transmission ducts 110 and 112 and the thermal buffer 310, for illustrative purposes these portions of the acoustic power loop have been plotted on the x-axis at $1/10^{th}$ scale in the graphs 400-406. The thermal converter 300 is disposed such that the regenerator 304 is at a location along the acoustic power loop where pressure oscillations have an approximate anti-phase relation to pressure oscillations in the mechanical converter 200.

In the graph 400, volumetric flow amplitude U in liters per second is plotted against acoustic power loop location. In the graph 402, pressure amplitude |p| is plotted against acoustic power loop location. Flow oscillations in the compression chamber 204 comprise predominantly pressure oscillations and minimal flow oscillations, while oscillations at a location approximately one-quarter of the way along the transmission duct 110 comprise predominantly flow oscillations and minimal pressure oscillations. This is illustrated in the graphs 400 and 402 where locations of maxima in flow amplitude U generally correspond to locations of minima in pressure amplitude, and vice versa. The volumetric flow amplitude U is zero at outer periphery 212 of the compression chamber 204 and expansion chamber 206, where the flow is constrained by the wall of housing 202. Flow amplitude U increases towards the center of the compression and expansion chambers 204 and 206 due to the motion of the diaphragm 208. The volumetric flow amplitude U in the each of the transmission ducts 110 and 112 increases to a maximum as pressure amplitude |p| is converted to flow amplitude (i.e. at a flow velocity anti-node) and then decreases again as the inertia of the flow is converted back to pressure amplitude.

Acoustic power $P_a$ may be computed from the volumetric flow and pressure amplitude in accordance with Eqn 1 above and is plotted against acoustic power loop location in the graph 404. The acoustic power $P_a$ increases through the compression chamber 204 due to the motion of the diaphragm 208, and is generally constant through the transmission duct 110, first plenum 308, and first heat exchanger 302. The acoustic power $P_a$ is then amplified in the regenerator 304, and is then generally constant through the second heat exchanger 306, second plenum 312, thermal buffer 310, and transmission duct 112. Acoustic power is then absorbed in the expansion chamber 206 to cause motion of the diaphragm 208, thus transferring acoustic power back to the compression chamber 204 and completing the acoustic power loop through the thermoacoustic transducer apparatus.

The phase the pressure and flow oscillations are plotted on the graph 406 against acoustic power loop location. The phase $\phi_p$ of the pressure oscillations is shown as a solid line and phase $\phi_u$ of the flow oscillations as a broken line. In this embodiment the difference in pressure oscillation phase φp between each of the compression chamber 204 and the expansion chamber 206 and the regenerator is about 145 degrees. Additionally pressure oscillations at a point 408 are anti-phase or 180 degrees out of phase with pressure oscillations in the expansion chamber 206 and pressure oscillations at a point 410 are anti-phase or 180 degrees out of phase with pressure oscillations in the compression chamber 204.

Temperature Dependence

As disclosed above, the transmission ducts 110 and 112 are configured to provide phase change between the compression chamber 204 and the expansion chamber 206. The phase change introduced by a duct, such as the ducts 110 and 112, is dependent on wavelength, which is given by:

$$\lambda = \frac{c}{f}, \qquad \text{Eqn 3}$$

where f is the operating frequency of the thermoacoustic apparatus and c is the speed of sound within the ducts. The speed of sound c is given by:

$$c = \sqrt{\gamma R_m T}, \qquad \text{Eqn 4}$$

where $\gamma$ is the gas isentropic constant, $R_m$ is the mass gas constant, and T is the temperature in degrees Kelvin. In operation of the thermoacoustic transducer apparatus the transmission ducts 110 and 112 will be close to ambient temperature, which may change over time causing the working gas in the ducts to have a corresponding change in temperature. The change of temperature of the working gas in the ducts 110 and 112 will cause a change in the speed of sound c within the ducts 110 and 112, which in turn causes a change in the pressure phase shift that is imparted by the ducts. For a thermoacoustic transducer optimized for a specific operating phase change between the compression and expansion chambers 204 and 206, a phase change due to an ambient temperature change of as little as 5° C. may result in a significant reduction in output power and efficiency of the apparatus.

By substituting Eqn 4 into Eqn 3, the wavelength as a function of working gas temperature T and frequency f may be written as:

$$\lambda = \frac{\sqrt{\gamma R_m T}}{f},\qquad \text{Eqn 5}$$

In the mechanical converter 200 shown in FIG. 2, the diaphragm 208 is coupled to the housing 202 via a mechanical spring 224. Resilient displacement of the diaphragm 208 occurs at a resonant frequency that is dependent on an overall stiffness acting on the diaphragm. The overall stiffness acting on the diaphragm 208 includes a mechanical stiffness due to the resilient wall 210, the stiffness of the mechanical spring 224, and a gas stiffness due to working gas pressure amplitudes bearing on surfaces 216 and 218 of the diaphragm 208.

In one embodiment, the respective lengths of the transmission ducts 110 and 112 are configured such that relative proportions of the gas stiffness and the mechanical spring stiffness in the overall stiffness cause the change in speed of sound with temperature to be at least partially offset by a corresponding change in the diaphragm resonant frequency. From Eqn 5 above it should be evident that if the diaphragm resonant frequency f increases with increasing temperature T, the effect of the temperature change on wavelength λ is at least partially offset such that the phase change between the pressure oscillations in the compression chamber 204 and the pressure oscillations in the expansion chamber 206 are at least partially compensated. In one embodiment, configuring the mechanical spring 224 to provide a mechanical stiffness contribution of at least half of the overall stiffness provides for compensation for changes in temperature over a relatively wide range of ambient temperatures.

Figure 5:
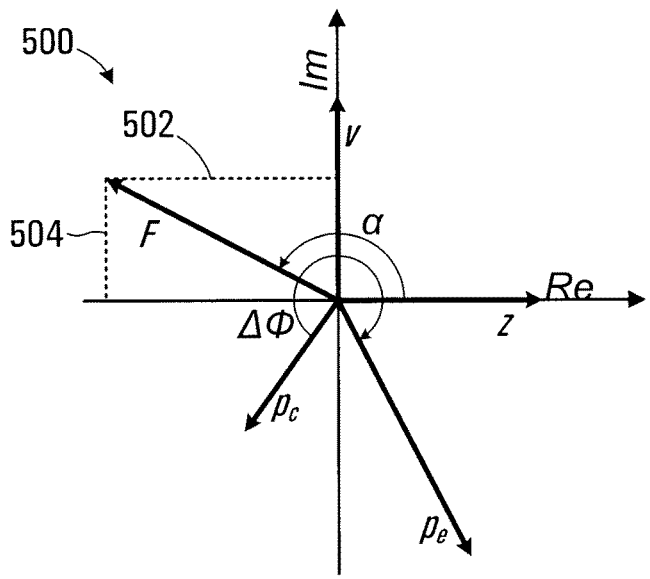
FIG. 5 is a complex plane phasor representation of pressures acting on a diaphragm of the mechanical converter shown in FIG. 2.

Referring to FIG. 5, a complex plane diagram including phasor representations of the oscillating pressures $p_c$ and $p_e$ acting on respective surfaces 218 and 216 of the diaphragm 208 is shown at 500. The diagram 500 also includes phasor representations of the diaphragm displacement z and diaphragm velocity v. Since the pressure phasors $p_c$ and $p_e$ act on opposite sides of the diaphragm 208, the net force on the diaphragm is equal to the diaphragm effective area multiplied by the vector difference of $p_c$ and $p_e$, which is shown at a force phasor F in the diagram 500. The angle Δϕ represents the pressure phase change through the acoustic power loop 118 between the compression and expansion chambers 204 and 206, which in the diagram 500 is assumed to have been determined as an optimal operating phase change for efficient operation in one particular embodiment of the apparatus.

The projection of the force phasor F on the velocity v shown by the horizontal broken line 502 corresponds to the component of the force on the diaphragm 208 that produces output power, which is given by:

$$P_{out} = \tfrac{1}{2} \text{Re}[F \cdot \tilde{v}]. \qquad \text{Eqn 6}$$

The phasor F thus needs to be located in upper half of the complex plane of the diagram 500 in order for the apparatus to produce output power. A projection of force phasor F on the real axis (Re) shown by the vertical the diaphragm motion shown by the vertical broken line 504 is negative, and thus corresponds to a gas stiffness component or gas spring component, which acts to oppose the motion of the diaphragm z. A positive force projection would instead correspond to a negative gas spring that may alternatively be understood to be an additional effective mass. A gas force contribution in the described embodiments may produce a positive, near zero, or negative gas stiffness. The gas stiffness works in parallel with the mechanical stiffness and determines the operating frequency of the apparatus. The operating frequency is given by:

$$f = \frac{1}{2\pi}\sqrt{\frac{k_m + k_g}{M}},\qquad \text{Eqn 7}$$

where $k_m$ is the mechanical stiffness acting on the diaphragm 208 and $k_g$ is the gas stiffness acting on the diaphragm. M is the overall mass associated with the diaphragm 208, which may include the diaphragm mass and an external mass associated with the coupling to the external energy system 222.

Following the pressure phasor from the compression chamber 204 to the expansion chamber 206 corresponds to rotating $p_c$ clockwise onto $p_e$ by approximately 285 degrees in the embodiment shown, which corresponds to the phase change predominantly imparted by the transmission ducts 110 and 112. However, as the temperature T in the transmission ducts 110 and 112 increases, the wavelength λ also increases and $P_e$ would thus be rotated by a smaller angle relative to $p_c$ and end up closer to the horizontal axis causing the resultant force phasor F to move closer to the horizontal axis. The gas stiffness contribution would thus increase, and from Eqn 7 above the frequency f would also increase. From Eqn 5, increased frequency f reduces the wavelength λ thus tending to return the phase change toward the optimal operating phase change Δϕ. Conversely, decreasing working gas temperature T within the ducts 110 and 112 cause the force phasor F to be rotated closer to the vertical axis, thus decreasing the gas stiffness contribution. The decreased gas stiffness contribution results in a decrease of the frequency f, which tends to counteract the temperature reduction. In order to keep the frequency f real and in a band around a desired operating frequency, the mechanical stiffness $k_m$ must be substantially larger than the expected range of the gas stiffness $k_g$, which varies substantially with temperature.

In general, for a larger possible gas stiffness contribution to the overall stiffness acting on the diaphragm 208 a smaller net rotation of the force phasor F is required to counteract the effect of the temperature change and the closer the operating phase change would remain to the optimal operating phase change Δϕ. However, the possible gas stiffness component of the overall stiffness is determined by the area of the diaphragm 208 and by the magnitudes of the pressure phasors $p_c$ and $P_e$ on either side of the diaphragm. Diaphragm area is generally determined in accordance with a desired power output for the apparatus while the pressure phasors $p_c$ and $P_e$ result from optimization of the apparatus to produce a desired efficiency and power output, thus constraining the possible gas stiffness component of overall stiffness acting on the diaphragm 208 to a range that by itself would not be sufficient to raise the engine operating frequency f to an optimum frequency. The mechanical stiffness provided by the additional mechanical spring 224 raises the frequency f into an optimum operating range.

Additionally, as disclosed above the gas stiffness represents a component of the overall stiffness that varies predominantly with frequency over a range of stiffness values. If the possible gas stiffness component of overall stiffness acting on the diaphragm 208 is too large, the overall stiffness would also be able to vary over a large range, which may facilitate operation of the thermoacoustic transducer apparatus at a low resonant frequency that is much lower than the intended resonant frequency or at a higher harmonic of the intended resonant frequency. For a weak mechanical stiffness $k_m$ a negative gas stiffness contribution $k_g$ may result in a negative total stiffness, which would prevent operation of the thermoacoustic apparatus. Advantageously, configuration of the mechanical spring 224 to provide a mechanical stiffness component of at least about half of the overall stiffness acting on the diaphragm 208 reduces the range of values that the overall stiffness acting on the diaphragm 208 may assume thus preventing operation at unintended frequencies. Configuration of the mechanical spring 224 to provide sufficient stiffness thus ensures operation at a single well defined frequency. The well defined frequency also has a desired temperature dependence due to the presence of the gas stiffness component in the overall stiffness.

The resonant frequency of the diaphragm 208 is further dependent on an overall mass associated with the diaphragm including at least a mass of the resilient wall 210 of the diaphragm and an external mass associated with the coupling to the external energy system 222. Advantageously, the use of a spring tube mechanical spring 224 permits the coupling to be disposed outside the housing 202 that contains the working gas.

As an example, for an apparatus configured as shown in FIG. 1-FIG. 3, it has been calculated that frequency would need to increase by about 1 Hz for each degree Celsius increase in temperature in the transmission ducts 110 and 112. Accordingly, if it is desired to accommodate a wide temperature operating range of ±50° C., the operating frequency would have to vary by about ±10%, which may be achieved if the overall stiffness acting on the diaphragm 208 varies by about ±20%. A maximum magnitude gas stiffness component $|k_{g\ max}|$ at a limit of the temperature operating range having values that range between $0.2k_m \le |k_{g\ max}| < k_m$ relative to the mechanical stiffness component $k_m$ would provide the necessary range of variation of about ±20%.

Advantageously, configuration of the mechanical converter 200 to provide the required gas stiffness component occurs within the existing working volume of the apparatus and a selected pressure phase difference $\Delta\phi$ across the diaphragm 208 and thus introduces no additional losses. In contrast, many prior art gas springs are implemented using an additional chamber volume having an associated increased relaxation loss at the walls of the added volume.

Figure 6:
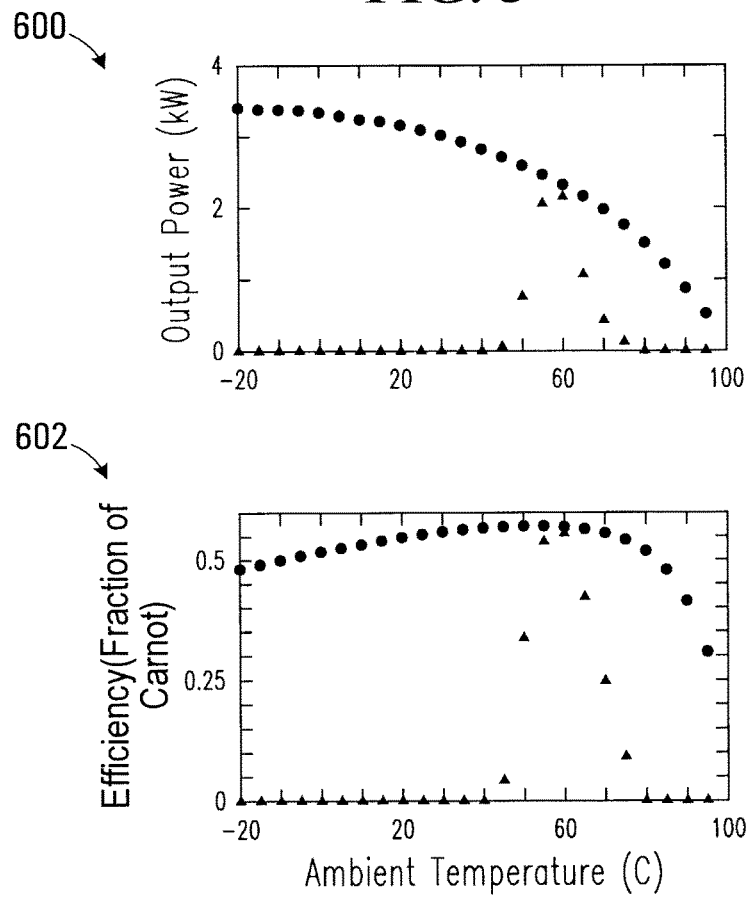
FIG. 6 are graphs of calculated output power and calculated operating efficiency of the apparatus shown in FIGS. 1-3 as a function of working gas temperature.

Referring to FIG. 6, a graph of calculated output power of the apparatus as a function of the working gas temperature T in the transmission ducts 110 and 112 is shown at 600. A graph of calculated operating efficiency (expressed as a fraction of Carnot efficiency) as a function of the working gas temperature T in the transmission ducts 110 and 112 is shown at 602. The triangle symbols represent fixed operating frequency operation without implementation of the temperature compensation disclosed above, and show that the apparatus only produces useful operating power over a narrow range of temperatures. The circle symbols represent variable operating frequency operation in which the temperature compensation as disclosed above is implemented and shows useful operating power output over a significantly wider range of temperatures.

As noted above, the force phasor F must be located in upper half of the complex plane and for optimal operating efficiency of this particular embodiment would have a phasor angle α of about 135 degrees at about 60° C. Accordingly, in the graph 602 the operating efficiency reduces more rapidly above 60° C. when the force phasor F approaches the horizontal axis and the projection of F onto the velocity v tends to zero, corresponding to an abrupt drop off of operating power generation.

Operating efficiency reduces more slowly below 60° C. when the force phasor F is almost vertical, corresponding to a maximum projection of F onto velocity v and thus maximum power out (although not at peak efficiency) and a very small or even negative gas stiffness contribution. Under these conditions, the gas stiffness contribution changes very rapidly with changing force phasor angle α, which corresponds to a region where the frequency compensation for working gas temperature changes is most effective. For a widest operating temperature range of this embodiment it would be advantageous to configure the transmission ducts 110 and 112 for a phase angle α that is less then 135 degrees, which would result in slightly reduced efficiency at the midpoint of the temperature operating range, but an overall wider temperature operating range.

Alternative Mechanical Converter

Figure 7:
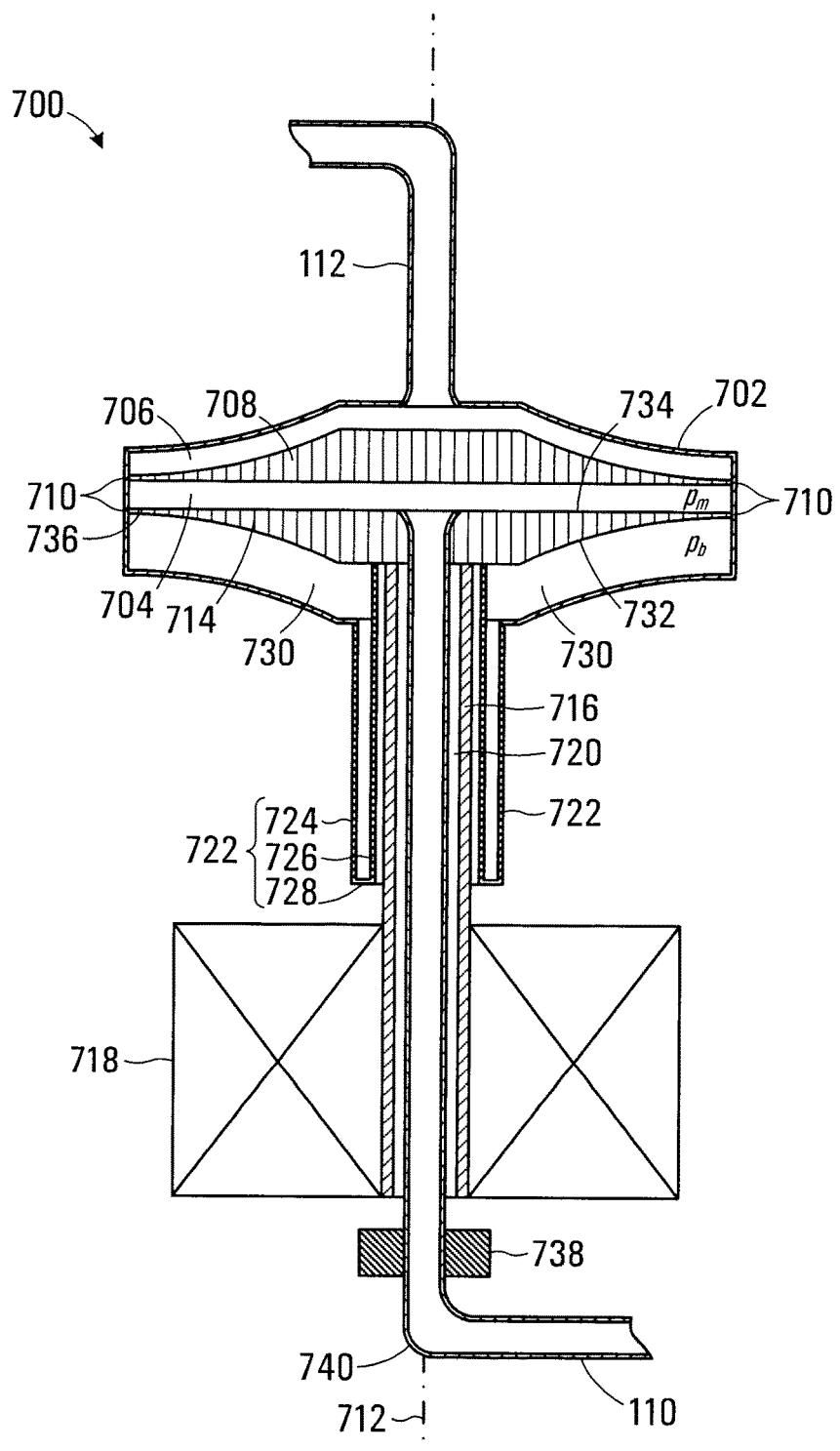
FIG. 7 is a schematic view of an alternative embodiment of a mechanical converter for implementing the apparatus shown in FIG. 1.

Referring to FIG. 7, a schematic cross sectional view of an alternative embodiment for implementing the mechanical converter 102 is shown generally at 700. The embodiment of the mechanical converter 700 shown in FIG. 7 generally corresponds to a beta-configuration Stirling transducer. The mechanical converter 700 includes a housing 702, which encloses a compression chamber 704 and an expansion chamber 706. The compression chamber 704 and expansion chamber 706 are separated by a displacer 708, which acts to vary a volume of the chambers 704 and 706. The displacer 708 comprises a resilient wall supported at a periphery 710 of the housing 702 and configured to facilitate displacement in a direction aligned with a central axis 712 of the mechanical converter 700.

The mechanical converter 700 also includes a diaphragm 714 and the compression chamber 704 extends between the displacer 708 and the diaphragm 714. In the embodiment shown, the diaphragm 714 also comprises a resilient wall supported at the periphery 710 of the housing 702.

In the schematic view of FIG. 7, the spacing between elements of the mechanical converter 700 has been increased for illustrative purposes. In practice, a longitudinal extent of the expansion and compression chambers 706 and 704 along the axis 712 may only be in the region of about 1 mm for example. Correspondingly, movements of the displacer 708 and diaphragm 714 would generally have a peak amplitude of about 200 μm.

The mechanical converter 700 further includes an input/output shaft 716. In this embodiment the shaft 716 is coupled between the diaphragm 714 and an external energy system 718. During operation, the diaphragm 714 undergoes periodic displacement for coupling energy between the mechanical converter 700 and the external energy system 718.

In this embodiment the mechanical converter 700 also includes a mechanical spring with is configured as a cylindrical tube spring 722 coupled between the diaphragm 714 and the housing 702. The tube spring 722 includes an outer cylindrical wall 724 and an inner cylindrical wall 726 joined by an annular wall 728 such that the cylindrical tube spring is folded back on itself. The outer cylindrical wall 724 is connected to the housing 702 and the inner cylindrical wall 726 is connected to the diaphragm 714. The tube spring 722 is operable to elastically deform in a direction generally aligned with the axis 712 in response to forces imparted on the tube spring by the diaphragm 714.

The mechanical converter 700 also includes a bounce chamber 730 for containing a pressurized gas volume bearing on an outer surface 732 of the diaphragm 714. The bounce chamber is charged to a gas pressure of $p_B \approx p_m$, which at least partially balances forces acting on an inner surface 734 of the diaphragm 714 due to the static pressure $p_m$ by providing a counter-force on the outer surface 732 of the diaphragm 714. The bounce chamber 730 is defined between the housing 702, the outer surface 732 of the diaphragm 714, and the cylindrical tube spring 722. In one embodiment a deliberate leak may be introduced between the bounce chamber 730 and the compression chamber 704 in the form of a narrow equalization conduit 736 such as a ruby pinhole. The equalization conduit 736 facilitates gaseous communication between the working gas in the apparatus and the gas volume in the bounce chamber 730. The equalization conduit 736 is sized to permit static pressure equalization between the working gas and the gas volume while being sufficiently narrow to prevent significant gaseous communication at time periods corresponding to an operating frequency of the transducer apparatus.

In the embodiment shown in FIG. 7 where the diaphragm 714 comprises a resilient wall, the tube spring 722 may be configured such that restorative forces provided by the elastic deformation of the tube spring operate in conjunction with restorative forces due to the resilience of the diaphragm, loading of the diaphragm by the working gas and the bounce chamber 730, and the loading due to the input/output shaft 716 to cause the diaphragm to have a desired natural frequency.

In this embodiment the input/output shaft 716 includes a hollow bore 720 for receiving a portion of the transmission duct 110, which in this embodiment is located coaxial with the central axis 712 and extends through the bore and through the diaphragm 714 to provide for fluid communication between the compression chamber 704 and the transmission duct 112. The transmission duct 110 when centrally located provides for a symmetric flow and symmetric acoustic path length between the compression chamber 704 and the transmission duct 112.

In the embodiment shown the transmission duct 110 is connected to the diaphragm 714 and consequently must be configured to facilitate motion of the diaphragm during operation. In one embodiment the transmission duct 110 may include a compliant portion configured to undergo axial compression and extension. The compliant portion of the transmission duct 110 would thus provide an additional spring force acting on the diaphragm 714, which should be taken into account in configuring the mechanical converter 700 for a desired natural frequency of the diaphragm. The mechanical converter 700 may also include a mechanical anchor 738 disposed at a location along the transmission duct 110, thus permitting a portion of the transmission duct extending between the diaphragm 714 and the mechanical anchor to act as the compliant portion. Portions of the transmission duct 110 including a bend 740 that are disposed below the mechanical anchor in FIG. 2 are constrained from moving and would thus not be subjected to periodic strains that may cause premature fatigue failure.

In other embodiments (not shown) gas flow may be directed via a manifold disposed proximate the periphery 710 of the compression chamber 704 to the transmission duct 110. The manifold may include multiple branches for symmetrically directing gas flow between the periphery 710 and the transmission duct 110, thus causing acoustic path lengths associated with the flows to have a generally similar length leading to a consistent phase relationship during operation of the apparatus. Similarly, in the expansion chamber 706, gas flow may also be directed via a manifold disposed proximate the periphery 710 of the chamber to the transmission duct 112 and the manifold may include multiple branches for symmetrically directing gas flow between the periphery 710 and the transmission duct 112.

In operation, when the displacer 708 and diaphragm 714 move so as to produce pressure oscillations within the compression chamber 704, the resulting compression and rarefaction in the working gas produces acoustic power which flows through the transmission duct 110 to the thermal converter 300 (shown in FIG. 3), through the first port 324 and to the first plenum 308. Referring to FIG. 3, the thermal converter 300 operates to convert thermal energy $Q_{in}$ provided from an external heat source into acoustic energy, thereby amplifying the acoustic power traveling through the first heat exchanger 302, regenerator 304, and second heat exchanger 306. The amplified acoustic power leaving the thermal converter 300 through the thermal buffer 310 and the second port 326 propagates along the transmission duct 112 back to the mechanical converter 700, where it is received in the expansion chamber 706. Pressure oscillations due to the amplified acoustic power in the expansion chamber 706 are operable to cause movement of the displacer 708, thereby transferring almost all the acoustic power back to the compression chamber 704. Pressure oscillations in the compression chamber 704 also cause the diaphragm 714 and the input/output shaft 716 to be displaced. A phase of the mechanical motion of the displacer 708 relative to a phase of the pressure oscillation in the compression chamber 704 is such that acoustic power is delivered to the working gas in the compression chamber by the displacer 708, while the phase of the mechanical motion of the diaphragm 714 is such that it removes acoustic power from the gas in the compression chamber. The process described above operates at a natural frequency associated with the apparatus 100, thus causing periodic motion of the input/output shaft 716. Motion of the input/output shaft 716 may be coupled to an external energy system 718 for extracting mechanical energy from the apparatus. The amplification of acoustic power thus provides sufficient power for sustaining periodic movement of the displacer 708 and diaphragm 714, while also providing useful output power at the diaphragm 714 for driving the input/output shaft 716.

Alternative Embodiments

Figure 8:
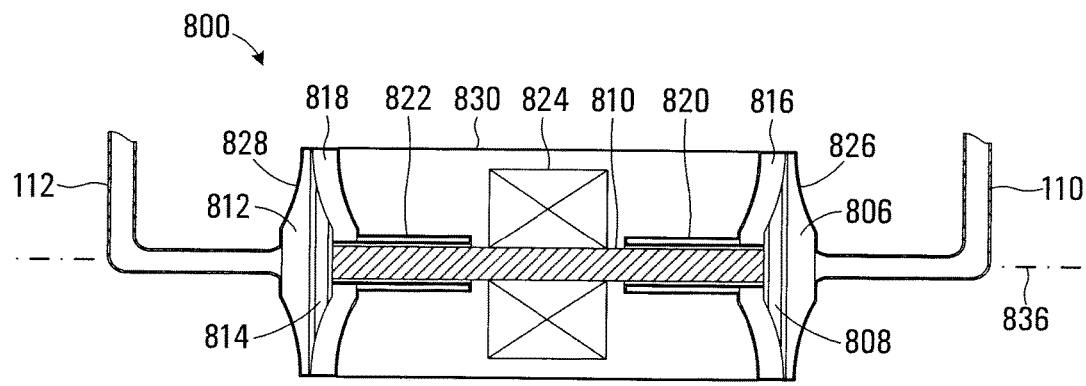
FIG. 8 is a schematic view of a thermoacoustic apparatus in accordance with another embodiment of the invention.

A schematic cross sectional view of a further embodiment for implementing the mechanical converter 102 is shown generally at 800 in FIG. 8. Referring to FIG. 8, the mechanical converter 800 includes a compression chamber 806 having a diaphragm 808 coupled to a shaft 810. The mechanical converter 800 also includes an expansion chamber 812 having a diaphragm 814 coupled to the shaft 810. The compression chamber 806 and expansion chamber 812 each have respective bounce chambers 816 and 818, and cylindrical tube springs 820 and 822, generally implemented as described above in connection with the embodiment shown in FIG. 2. The mechanical converter 800 also includes an external energy system 824. The compression chamber 806 and expansion chamber 812 each have respective chamber walls 826 and 828, and the embodiment shown further includes a housing 830. The housing 830 extends between the respective chamber walls for supporting the compression and expansion chambers in spaced apart relation and also encloses the external energy system 824.

The compression chamber 806 is in fluid communication with the transmission duct 110 and the expansion chamber 812 is in fluid communication with the transmission duct 112. The transmission ducts 110 and 112 are shown in FIG.

1. The shaft 810 extends between the compression chamber diaphragm 808 and the expansion chamber diaphragm 814 and provides a direct mechanical coupling for coupling energy between the respective diaphragms. The shaft 810 thus causes operating displacements of the expansion chamber diaphragm 814 to lead the compression chamber diaphragm 808 by a phase angle of 180 degrees.

Figure 9:
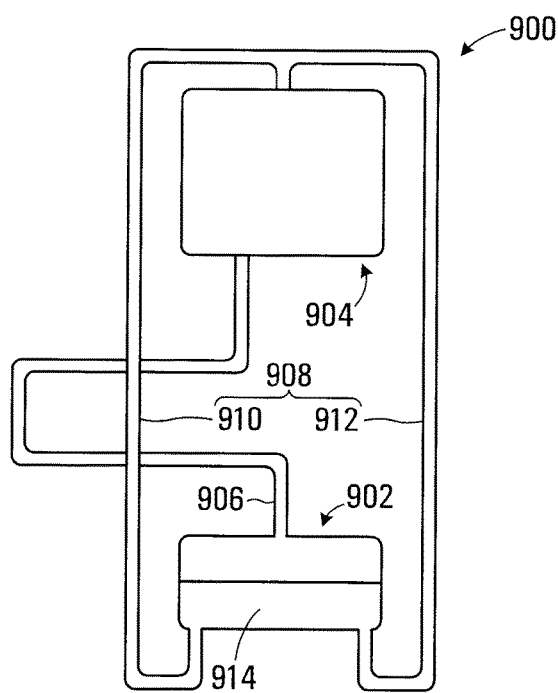
FIG. 9 is a schematic view of a thermoacoustic apparatus in accordance with another embodiment of the invention.

Another embodiment of a thermoacoustic transducer apparatus is shown in FIG. 9 at 900. In the embodiment shown in FIG. 2, the transmission duct 110 is in fluid communication with the compression chamber 204 at a close to central location, thus causing generally symmetric gas flow within the compression chamber. Referring to FIG. 9, the apparatus 900 includes a mechanical converter 902 and a thermal converter 904. The apparatus 900 also includes a transmission duct 908, which provides fluid communication between a compression chamber 914 of the mechanical converter 902 and the thermal converter 904. The transmission duct 908 includes a plurality of duct lengths (of which two duct lengths 910 and 912 are shown) disposed to provide parallel fluid communication between the compression chamber 912 and the thermal converter 904. The duct lengths 910 and 912 are fluidly coupled at peripheral locations to the compression chamber 914, to promote generally more symmetrical gas flow within the compression chamber thus causing acoustic path lengths associated with the flows to have a generally similar length leading to a consistent phase relationship during periodic flow of the working gas. The apparatus 900 also includes a transmission duct 906 extending between the mechanical converter and the thermal converter The acoustic impedance of a transmission duct is inversely proportional to cross-section area, but in the embodiment shown in FIG. 9 is split among parallel transmission ducts 910 and 912. Using multiple ducts to implement the transmission duct 908 increases the duct wall area and thus increases the relaxation loss on the walls and the viscous shear loss along the walls. However geometrical constraints may make it more desirable to couple flow between the mechanical converter 902 at the edges of the compression chamber 914 rather than from a single central port, in which case multiple transmission ducts 910 and 912 result in a more symmetrical flow in the mechanical converter 902, maintain more uniform flow phase differences, and avoid large local losses due to flow crowding.

Figure 10:
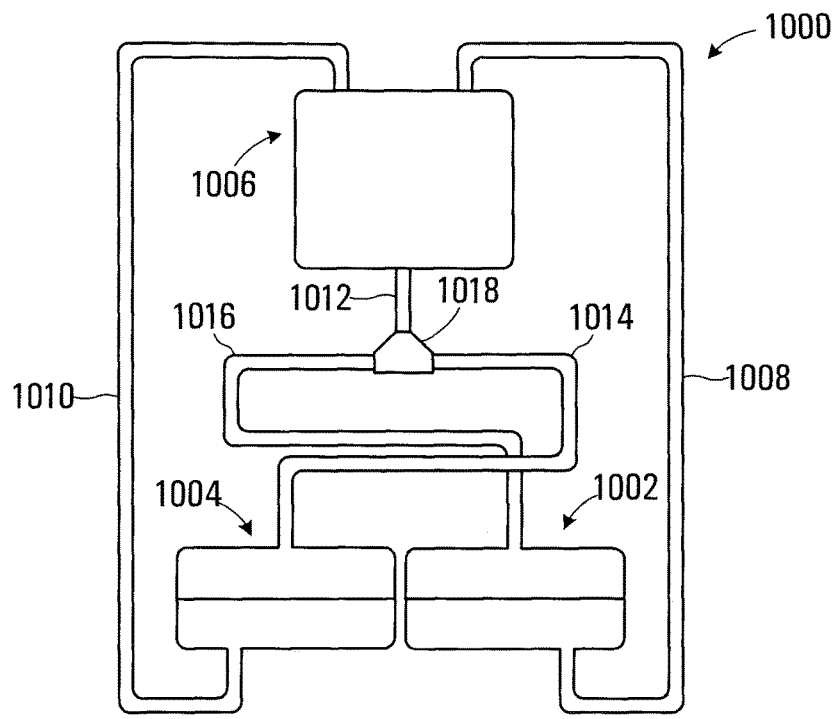
FIG. 10 is a schematic view of a thermoacoustic apparatus in accordance with another embodiment of the invention.

Referring to FIG. 10, a further embodiment of the apparatus of FIG. 1 is shown at 1000. The apparatus 1000 includes a first mechanical converter 1002, a second mechanical converter 1004, and a single thermal converter 1006. The first mechanical converter 1002 is in fluid communication with the thermal converter 1006 through a transmission duct 1008 and the second mechanical converter 1004 is in fluid communication with the thermal converter 1006 through a transmission duct 1010. The apparatus 1000 also includes a common transmission duct 1012 in fluid communication with the thermal converter 1006, a transmission duct 1014 between the first mechanical converter 1002 and the common transmission duct 1012, and a transmission duct 1016 between the second mechanical converter 1004 and the common transmission duct. The transmission duct 1016 and transmission duct 1014 feed into the common transmission duct 1012 through a wye joint 1018 that provides a smooth transition that minimizes local losses. Additionally the wye joint 1018 may be located at a low volumetric flow locations in order to further minimize local losses. Advantageously, the apparatus 1000 facilitates use of a single thermal converter 1006 with two mechanical converters 1002 and 1004. In other embodiment more than two mechanical converters may be configured in fluid communication with the single thermal converter 1006. The thermal converter 300 is required to operate at high temperatures and therefore may include expensive materials that increase the cost of this component.

In the embodiments shown in FIG. 9 and FIG. 10 the mechanical converters 902, 1002 and 1004 may be implemented using either the mechanical converter 200 shown in FIG. 2 or the mechanical converter 700 shown in FIG. 7 or the mechanical converter 800 shown in FIG. 8.

Acoustic Operating Noise

During operation of the mechanical converter 200 shown in FIG. 2 as a heat engine, movements of the diaphragm 208 in one direction along the axis 214 will impart a housing 202 motion in an opposite direction. Similarly, for the mechanical converter 700 shown in FIG. 7, movements of the displacer 708 and diaphragm 714 along the axis 712 will impart unbalanced forces on the housing 702. The forces imparted on the housing 202 or 702 will generally cause the housing to vibrate at the operating frequency of the apparatus 100, thus generating acoustic noise in the form of a single frequency tone at the operating frequency (for example at about 500 Hz). In some embodiments a sound power associated with the generated noise may be in the region of 100 dBm, which may prohibit operation in some noise sensitive environments such as residential housing, for example.

Figure 11:
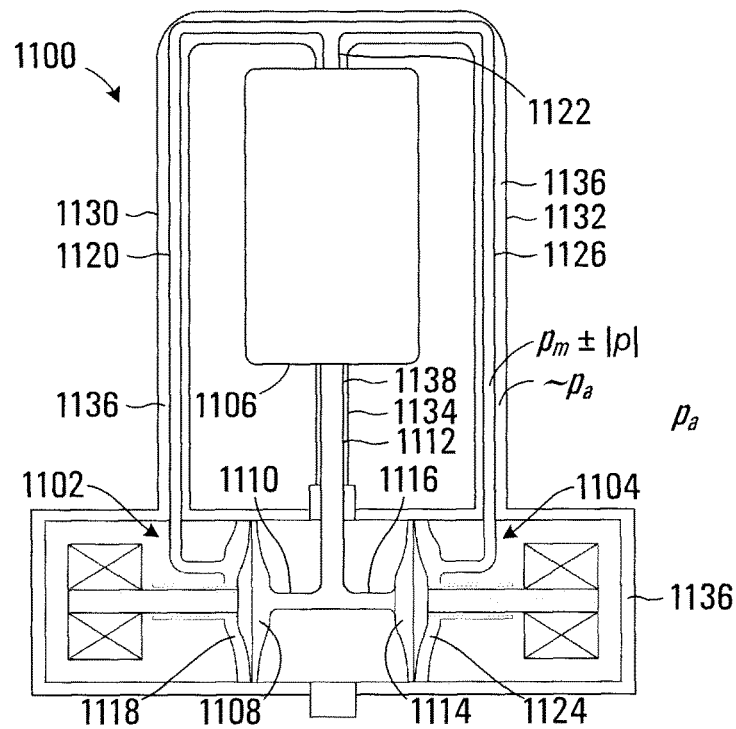
FIG. 11 is a schematic view of a thermoacoustic apparatus in accordance with a another embodiment of the invention including a transmission duct embodiment for use in any one of the above embodiments.

Referring to FIG. 11, a thermoacoustic apparatus in accordance with another embodiment of the invention is shown generally at 1100. The apparatus 1100 includes a first mechanical converter 1102 and a second mechanical converter 1104. The mechanical converters 1102 and 1104 are each configured generally as disclosed above in connection with the mechanical converter 200. The apparatus 1100 also includes a thermal converter 1106. The first mechanical converter 1102 includes an expansion chamber 1108 in fluid communication with the thermal converter 1106 through a transmission duct 1110 and a transmission duct 1112. The second mechanical converter 1104 includes an expansion chamber 1114 in fluid communication with the thermal converter 1106 through a transmission duct 1116 and the transmission duct 1112. The transmission duct 1112 thus provides a common duct for gas flow associated with both expansion chambers 1108 and 1114 of the respective first and second mechanical converters 1102 and 1104. The cross-sectional area of the transmission duct 1112 is generally larger than the transmission ducts 1110 and 1116 to accommodate flow of greater acoustic power through this common duct length. The first mechanical converter 1102 also includes a compression chamber 1118 in fluid communication with the thermal converter 1106 through a transmission duct 1120 and a transmission duct 1122 and the second mechanical converter 1104 includes a compression chamber 1124 in fluid communication with the thermal converter through a transmission duct 1126 and the transmission duct 1122.

The use of the first mechanical converter 1102 and second mechanical converter 1104 configured as shown in FIG. 10 provides motion cancellation for reducing acoustic noise. Since both mechanical converters 1102 and 1104 are driven from the same thermal converter, frequency matched operation is guaranteed and phase matched operation is achievable provided the transmission ducts 1110 and 1116, 1120 and 1126 are of equal length. In operation of the apparatus 1100, the first mechanical converter 1102 and second mechanical converter 1104 may have slight operating differences due variations in manufacturing and assembly, which may cause the mechanical converters to have slightly different amplitudes or phases of motion resulting in incomplete cancellation of forces. In one embodiment, the motion of the first and second mechanical converters 1102 and 1104 may be balanced to account for such minor differences by adjusting the length of one or more of the transmission ducts 1110, 1116, 1120, and/or 1126, for example. The motion of the diaphragms of the mechanical converters 1102 and 1104 are responsive to small changes in transmission duct length, which may thus be used to balance the motions of the mechanical converters. In addition to or as an alternative to changing a physical length of the transmission ducts 1110, 1116, 1120, and/or 1126, small changes in acoustic path length may also be achieved by changing a cross-sectional profile of the respective ducts. Changes in cross-sectional profile may be used to make a small one-time adjustment to acoustic path length by, for example, swaging a portion of duct to a smaller cross-section duct using an external compression tool. Other small adjustments to the mechanical resonators in the system formed by the diaphragm, attached springs, and masses or by adjustments in the electrical systems attached to each of the mechanical resonators may also be used to achieve balanced operation.

While balancing of mechanical converters and external energy systems in accordance with the embodiment of FIG. 11 may substantially eliminate housing vibration, other sources of acoustic noise generation such as oscillation of the walls of pressurized volumes that are subject to the working gas pressure oscillations may still generate noise having significant audible level. For example, a 2 m length of transmission duct (about 1 wavelength in helium at 500 Hz) would emit about 90 dBm of sound power due to expansion and contraction of the duct walls in response to pressure oscillations. While the wall thickness would generally be sufficiently thick to reduce hoop stress to a safe level as prescribed for pressure vessels, thus providing sufficient wall strength for withstanding the working pressure and pressure oscillations, it would not be practical to eliminate noise generation by thickening the walls alone.

In FIG. 11 the transmission ducts 1120 and 1126 and the transmission duct 1112 have inner walls that are each enclosed by respective outer walls 1130, 1132, and 1134, which are spaced apart from the transmission ducts to define isolating volumes 1136 and 1138 surrounding the respective transmission ducts. The transmission ducts 1120 and 1126 and 1112 are configured to withstand the full working pressure $p_m \pm |p|$. The volumes 1136 and 1138 are charged to a pressure $p_a$ corresponding to an atmospheric pressure of the surrounding environment. Acoustic noise produced by periodic movement of walls of the transmission ducts 1120, 1126 and 1112 due to the working pressure oscillations would generate significant sound level. However a resulting oscillating pressure within the volumes 1136 and 1138 at the mean pressure $p_a$ is very small. Furthermore, there is no substantial pressure differential between the volumes 1136 and 1138 and the environment and thus the outer walls 1130, 1132, and 1134 do not require any significant mechanical stiffness on the scale of what is required for the inner wall and would not experience any appreciable periodic movement resulting in very low external noise level. In one embodiment, the outer walls 1130, 1132, and 1134 may be fabricated from a plastic material, for example.

Figure 12:
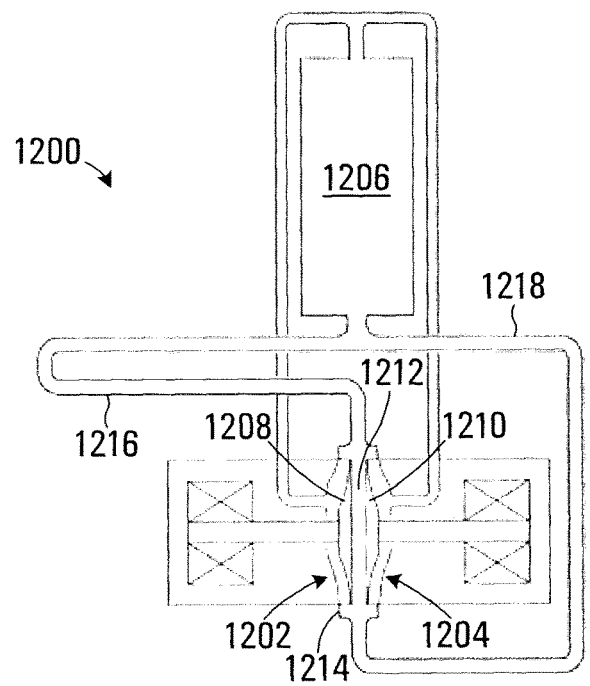
FIG. 12 is a schematic view of a thermoacoustic apparatus in accordance with a another embodiment of the invention.

Referring to FIG. 12, a thermoacoustic apparatus in accordance with another embodiment of the invention is shown generally at 1200. The apparatus 1200 includes a first mechanical converter 1202 and a second mechanical converter 1204. The apparatus 1100 also includes a thermal converter 1206. Each of the first and second mechanical converters has a respective diaphragm 1208 and 1210, which define a common expansion chamber 1212 extending between the diaphragms. In this embodiment, the apparatus 1200 further includes a manifold 1214 disposed at a periphery of the common expansion chamber 1212 and operable to provide fluid communication between the common expansion chamber and thermal converter 1206 through one or more transmission ducts. In this embodiment two transmission ducts 1216 and 1218 are shown, but in general the apparatus 1200 may include a plurality of transmission ducts symmetrically disposed in communication with the manifold 1214.

While in the embodiment shown in FIG. 12, the apparatus 1200 is configured having a common expansion chamber 1212, in other embodiments the apparatus may be configured to have a common compression chamber.

Multiple Thermal Converters

Figure 13:
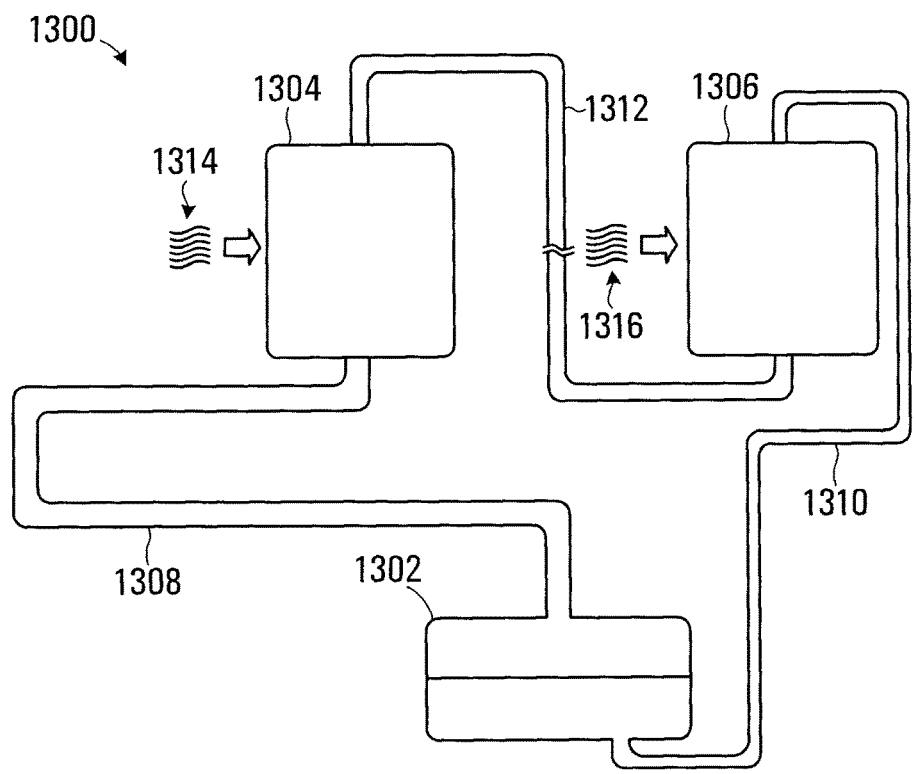
FIG. 13 is a schematic view of a thermoacoustic apparatus including an alternative thermal converter embodiment of the invention.

Referring to FIG. 13, a thermoacoustic apparatus in accordance with another embodiment of the invention is shown generally at 1300. The apparatus 1300 includes a mechanical converter 1302, a first thermal converter 1304, and a second thermal converter 1306. In one embodiment the mechanical converter 1302 may have a beta-configuration such as that shown in FIG. 7, while in other embodiments the mechanical converter may have an alpha-configuration such as that shown in FIG. 2. The mechanical converter may also comprise multiple mechanical converters in parallel as in the balanced embodiment of FIG. 11. The mechanical converter 1302 is in fluid communication with the first thermal converter 1304 through a transmission duct 1308 and with the second thermal converter 1306 through a transmission duct 1310. The first thermal converter 1304 is in fluid communication with the second thermal converter 1306 through a transmission duct 1312.

The first thermal converter 1304 is configured to receive thermal energy from a first external source 1314 while the second thermal converter 1306 is configured to receive thermal energy from a second external source 1316. In one embodiment the first and second external sources of thermal energy 1314 and 1316 are provided by combustion of a fuel gas, such as biogas for example, where the first external source 1314 may comprise a high temperature portion of heat generated by the gas combustion, while the second external source 1316 may comprise a low temperature portion of heat produced during the gas combustion. Accordingly the first thermal converter 1304 would be configured for high temperature operation while the second thermal converter 1306 would be configured for lower temperature operation. The combined effect of the first and second thermal converters 1304 and 1306 would result in a greater portion of available thermal energy from the gas combustion being used by the apparatus 1300

The embodiment of FIG. 13 where two or more thermal converters operate at different temperatures is advantageous for efficient extraction of heat from combustion exhaust in a waste heat application. In general, significant heat cannot be extracted from a gas stream without dropping the temperature of the stream significantly. In embodiments that include only a single thermal converter, a choice must be made between operating at high temperature with high thermal converter efficiency while allowing most of the heat to exit un-recovered or operating at a low temperature and lower thermal conversion efficiency while capturing more of the available heat in the stream. In embodiments that include multiple thermal converters, portions of heat may be captured at a cascade of decreasing temperatures and more optimally converted while at the same time capturing a greater fraction of the available heat in the stream.

The embodiment of FIG. 13 also provides an alternate method of capturing more available heat of from combustion of a fuel such as a gas or liquid fuel, for example when the heat input to the thermal converter is a dedicated burner. Traditionally, in order to operate at high temperature with a high efficiency thermal converter, combustion air must be preheated by using an exhausted stream in a counter flow recuperator that transfers a majority of the remaining heat in the exhaust stream to the incoming combustion air. Omitting the recuperator would generally result in an inefficient combustion system, as substantial remaining heat in the exhaust stream (given the high operating temperature of the thermal converter) would be wasted. One problem with implementing a recuperator is the need for large areas of costly high temperature materials, which may be subject to oxidization and hot corrosion. Pre-heating of the combustion air also results in higher combustion temperatures leading to exponentially greater nitrogen oxide ($NO_x$) production. Advantageously, the embodiment of FIG. 13 may be used to implement a system in which efficiencies remain high without preheating combustion air to high temperature, since instead of a recuperator the first high temperature thermal converter may be followed with one or more lower temperature thermal converters thereby capturing more of the heat without compromising the efficiency of the highest temperature stage.

In one embodiment the length of the transmission duct 1312, may be selected such that the acoustic path length corresponds to a whole number of wavelengths at the operating frequency. For example, if the transmission duct 1308 has a length corresponding to about one wavelength at the operating frequency, the first and second thermal converters 1304 and 1306 would each be located such that a flow velocity amplitude of the working gas is near a minimum through the thermal converter. The overall length of the transmission duct made up by the transmission duct 1308, second transmission duct 1310, and transmission duct 1312, would thus be approaching two-wavelengths at the operating frequency.

In other embodiments additional thermal converters may be added. For example three thermal converters in series may be in fluid communication through transmission duct lengths having an acoustic path of about a half wavelength each for an overall transmission duct length between the first and last thermal converters of one-wavelength at the operating frequency. Each thermal converter would be located at a point of minimum flow velocity amplitude of the working gas.

The embodiments disclosed above by including transmission ducts provide several advantages and also provide some flexibility in configuration of the apparatus 100 shown in FIG. 1. For example, the transmission ducts may be configured to place components that operate at high temperatures within the thermal converter, while the mechanical converter operates at a significantly reduced temperature. This has the advantage of facilitating additional flexibility in the selection of materials for the mechanical converter, since the materials are not required to withstand high operating temperatures. Additionally, transmission ducts may be branched or paralleled so that lengths of transmission duct may be used to facilitate configuration of multiple mechanical converters for operation with a single shared thermal converter. This facilitates configuration of the mechanical converters as shown in FIG. 11 for reducing acoustic noise generation by the apparatus. Operation of one or more mechanical converters with multiple thermal converters in parallel or series (FIG. 13) is also enabled by the embodiment shown. The transmission ducts also provide a convenient means for tuning the mechanical converters for optimal operation by varying an acoustic path length of the transmission duct or a portion thereof.

The embodiments disclosed above, by including transmission ducts permit the mechanical converter to operate at near ambient temperature. This provides advantages over mechanical converters closely coupled to thermal converters as in traditional Stirling engines or refrigerators that operate at high or low temperatures, which may require significant thermal insulation. Thermal insulation generally increases an overall size of the transducer apparatus. Furthermore, while the transmission ducts introduce some additional losses, configuration of the transducer apparatus in accordance with embodiments of the invention disclosed herein may offset the additional losses and in some embodiments provide increased power density. Increased power density would allow the apparatus to have a reduced size for the same power output. For example, a mechanical converter configured to include a diaphragm having a diameter of about 140 mm may be capable of generating an output power of about 3 kW.

While specific embodiments of the invention have been described and illustrated, such embodiments should be considered illustrative of the invention only and not as limiting the invention as construed in accordance with the accompanying claims.

What is claimed is:

1. A thermoacoustic transducer apparatus comprising:
a mechanical converter operable to provide power conversion between acoustic power and mechanical power, the mechanical converter including at least one diaphragm defining a compression chamber and an expansion chamber within the mechanical converter, the at least one diaphragm having a diaphragm surface area;
a thermal converter including a flow passage having a regenerator portion thermally coupled to provide power conversion between acoustic power and thermal power, the regenerator portion having a regenerator flow area;
the mechanical converter being in fluid communication with the flow passage of the thermal converter through transmission ducts extending between the compression chamber and the flow passage and between the expansion chamber and the flow passage respectively, the transmission ducts completing an acoustic power loop through the flow passage between the compression chamber and the expansion chamber, the acoustic power loop having a working volume for containing a working gas and being operable to facilitate acoustic power flow between the compression chamber and the expansion chamber;
wherein a cross-sectional area of the transmission ducts is less than the regenerator flow area and the regenerator flow area is less than the diaphragm surface area; and
wherein the at least one diaphragm is operable to undergo resilient displacement to cause pressure oscillations within the working volume and wherein the acoustic power loop is configured to cause at least one location along the acoustic power loop to have pressure oscillations that have an anti-phase relation to pressure oscillations in the mechanical converter.

2. The apparatus of claim 1 wherein the flow passage of the thermal converter comprises a plurality of the regenerator portions configured for parallel flow and wherein the regenerator flow area comprises an overall area associated with the plurality of the regenerator portions.

3. The apparatus of claim 1 wherein the mechanical converter comprises a plurality of mechanical converters configured in parallel and wherein the diaphragm surface area comprises an overall diaphragm surface area associated with the plurality of mechanical converters.

4. The apparatus of claim 1 wherein the cross-sectional area of the transmission ducts is at least about 10 times less than the diaphragm surface area.

5. The apparatus of claim 4 wherein the wherein the transmission duct between the compression chamber and the flow passage has a first cross-sectional area and wherein the transmission duct between the expansion chamber and the flow passage has a second cross-sectional area and wherein the first cross-sectional area is less than the second cross-sectional area.

6. The apparatus of claim 1 wherein the transmission ducts have respective lengths that are selected to cause a phase change of about 360 degrees between pressure oscillations in the compression chamber and pressure oscillations in the expansion chamber.

7. The apparatus of claim 1 wherein the transmission ducts have respective lengths that are selected to cause:
an initial phase change of about 360 degrees between pressure oscillations in the compression chamber and pressure oscillations in the expansion chamber; and
at least one additional 360 degree phase change between pressure oscillations in the compression chamber and pressure oscillations in the expansion chamber such that an overall phase change through the acoustic power loop has the same effect as the initial phase change.

8. The apparatus of claim 1 wherein the apparatus further comprises a mechanical spring coupled to the at least one diaphragm and wherein the resilient displacement occurs at a resonant frequency that is in part dependent on an overall stiffness acting on the at least one diaphragm, the overall stiffness including at least a diaphragm stiffness, a gas stiffness due to working gas bearing on the at feast one diaphragm, and the mechanical spring stiffness, and wherein a contribution to the overall stiffness associated with the mechanical spring stiffness comprises at least half of the overall stiffness.

9. The apparatus of claim 8 wherein a change in temperature in the transmission ducts results in a change of speed of sound associated with acoustic power flow within the acoustic power loop and wherein the respective lengths of the transmission ducts are configured such that relative proportions of the gas stiffness and the mechanical spring stiffness in the overall stiffness cause the change in speed of sound to be at least partially offset by a corresponding change in the resonant frequency such that the phase change between the pressure oscillations in the compression chamber and the pressure oscillations in the expansion chamber due to the change in the speed of sound is at least partially compensated.

10. The apparatus of claim 8 wherein the mechanical converter is housed within a pressure vessel and wherein the at least one diaphragm is coupled to an external energy system for transfer of mechanical power between the external energy system and the at least one diaphragm, the external energy system being disposed outside of the pressure vessel, and wherein the resonant frequency is further dependent on an overall mass including at least a diaphragm mass and an external mass associated with the coupling to the external energy system, and wherein the external mass is greater than the diaphragm mass.

11. The apparatus of claim 10 wherein the external energy system comprises one of:
an electric generator; and
a prime mover.

12. The apparatus of claim 8 wherein the mechanical spring comprises a resilient wall portion coupled between the at least one diaphragm and a chamber wall of one of one of the compression chamber and the expansion chamber, the resilient wall portion being operable to provide a seal for containing working gas within the chamber while facilitating the resilient displacement of the at least one diaphragm.

13. The apparatus of claim 12 wherein the resilient wall portion comprises a cylindrical tube extending between the at least one diaphragm and the chamber wall, the tube being configured to elastically deform in a direction generally aligned with a cylindrical axis of the tube.

14. The apparatus of claim 13 wherein the cylindrical tube comprises a first cylindrical tube portion coupled to the at least one diaphragm and a second cylindrical tube portion coupled to the chamber wall, the first and second cylindrical tube portions being coaxially disposed and coupled together to form a folded cylindrical tube.

15. The apparatus of claim 1 wherein an extent of at least one of the compression chamber and the expansion chamber is selected to provide a desired acoustic impedance for facilitating acoustic coupling between the chamber and the respective transmission duct.

16. The apparatus of claim 1 wherein the mechanical converter is configured to cause a volumetric flow between the compression chamber and the transmission duct extending between the compression chamber and the flow passage that differs from a volumetric flow between the expansion chamber and the transmission duct extending between the expansion chamber and the flow passage.

17. The apparatus of claim 1 wherein the compression chamber and the expansion chamber are configured to direct gas flows within the respective chambers in a direction generally parallel to a surface of the at least one diaphragm.

18. The apparatus of claim 1 wherein the at least one diaphragm has a thickness profile across the diaphragm that is selected to cause stress concentrations in the diaphragm to be reduced.

19. The apparatus of claim 1 wherein a static pressure associated with the working gas is at least about 80 Bar.

20. The apparatus of claim 1 wherein an operating frequency associated with the periodic flow of the working gas is at least about 300 Hertz.

21. The apparatus of claim 1 wherein at least a portion of at least one of the transmission ducts comprises a plurality of ducts disposed to provide parallel fluid communication between the respective chamber and the flow passage of the thermal converter.

22. The apparatus of claim 1 wherein the flow passage of the thermal converter further comprises a first heat exchanger portion in thermal communication with one of:
an external thermal energy source for receiving thermal energy and transferring the thermal energy to working gas flowing through the flow passage; and
an external thermal energy sink for transferring thermal energy from the working gas flowing through the flow passage to the external thermal energy sink.

23. The apparatus of claim 1 wherein the thermal converter comprises a thermal buffer for reducing heat transfer between the thermal converter and the mechanical converter, the thermal buffer being in fluid communication between the flow passage and the transmission duct extending between the expansion chamber and the flow passage.

24. The apparatus of claim 1 wherein during acoustic power flow between the compression chamber and the expansion chamber a standing wave component and a traveling wave component are established within the acoustic power loop and wherein the cross-sectional areas of transmission ducts are selected to cause the relative magnitudes of the standing wave component and traveling wave component to be apportioned to minimize overall losses in the apparatus.

25. The apparatus of claim 1 wherein the thermal converter is disposed within a housing charged to a gas pressure approximately equivalent to a mean working pressure of the working gas.

26. The apparatus of claim 1 wherein the mechanical converter comprises a first mechanical converter and further comprising:
   a second mechanical converter having at least one diaphragm defining a compression chamber and an expansion chamber within the second mechanical converter, the second mechanical converter being in fluid communication with the flow passage of the thermal converter through transmission ducts extending between the compression chamber of the second mechanical converter and the flow passage and between the expansion chamber of the second mechanical converter and the flow passage respectively, the transmission ducts completing a second acoustic power loop through the flow passage between the compression chamber and the expansion chamber of the second mechanical converter.

27. The apparatus of claim 26 wherein the first and second mechanical converters are configured such that one of:
   a) the expansion chamber of the first mechanical converter and the expansion chamber of the second mechanical converter comprise a common expansion chamber extending between the at least one diaphragm of the first mechanical converter and the at least one diaphragm of the second mechanical converter; and
   b) the compression chamber of the first mechanical converter and the compression chamber of the second mechanical converter comprise a common compression chamber extending between the at least one diaphragm of the first mechanical converter and the at least one diaphragm of the second mechanical converter.

28. The apparatus of claim 26 wherein at least a portion of at least one of the transmission ducts comprises a plurality of ducts disposed to provide parallel fluid communication between the flow passage of the thermal converter and the respective chambers.

29. The apparatus of claim 26 wherein at least one of the transmission ducts comprises a common portion providing fluid communication between the respective chambers and the flow passage of the thermal converter.

30. The apparatus of claim 26 wherein resilient displacement of the at least one diaphragm associated with the first mechanical converter generates periodic forces directed along a first axis and resilient displacement of the at least one diaphragm associated with the second mechanical converter generates periodic forces directed along a second axis and wherein the first and second mechanical converters are disposed such that the first axis and second axis are generally oriented to cause the respective periodic forces to substantially cancel each other.

31. The apparatus of claim 30 wherein the first axis and second axis are generally coaxially aligned.

32. The apparatus of claim 1 wherein the at least one diaphragm comprises a compression chamber diaphragm and an expansion chamber diaphragm, the respective compression chamber and expansion chamber diaphragms being mechanically coupled to move substantially in unison to act as the diaphragm of the mechanical converter.

33. The apparatus of claim 1 wherein at least one of the transmission ducts comprises an inner wall that flexes in response to the pressure oscillations within the acoustic power loop and further comprising an outer wall disposed about the inner wall and defining a isolating volume between the inner and outer wall, the isolating volume being charged to a lower static pressure than the working gas pressure and being operable to attenuate sound/vibration generated by the flexing of the inner wall.

34. The apparatus of claim 1 wherein the thermal converter comprises at least a first thermal converter and a second thermal converter each having an associated flow passage and further comprising a transmission duct extending between the respective flow passages of the first and second thermal converters and forming part of the acoustic power loop.

* * * * *